US009977049B2

(12) United States Patent
Sakai

(10) Patent No.: US 9,977,049 B2
(45) Date of Patent: *May 22, 2018

(54) SCANNING PROBE MICROSCOPE AND CONTROL METHOD THEREOF

(71) Applicant: OLYMPUS CORPORATION, Shibuya-ku, Tokyo (JP)

(72) Inventor: Nobuaki Sakai, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/092,027

(22) Filed: Apr. 6, 2016

(65) Prior Publication Data

US 2016/0216293 A1 Jul. 28, 2016

Related U.S. Application Data

(60) Division of application No. 14/251,154, filed on Apr. 11, 2014, now Pat. No. 9,335,341, which is a
(Continued)

(30) Foreign Application Priority Data

Oct. 14, 2011 (JP) ................. 2011-227114
Oct. 14, 2011 (JP) ................. 2011-227115
May 2, 2012 (JP) ................. 2012-105185

(51) Int. Cl.
*G01Q 10/00* (2010.01)
*G01Q 10/06* (2010.01)
(Continued)

(52) U.S. Cl.
CPC ........... *G01Q 10/00* (2013.01); *G01Q 10/065* (2013.01); *G01Q 60/32* (2013.01); *B82Y 35/00* (2013.01)

(58) Field of Classification Search
CPC ...... G01Q 10/00; G01Q 10/065; G01Q 60/32; G01Q 30/04
See application file for complete search history.

(56) References Cited

U.S. PATENT DOCUMENTS 5,260,572 A * 11/1993 Marshall ................ B82Y 35/00
250/307
6,038,916 A * 3/2000 Cleveland .............. G01Q 60/34
73/105
(Continued)

FOREIGN PATENT DOCUMENTS

JP 2003194699 A 7/2003
JP 2004294218 A 10/2004
(Continued)

OTHER PUBLICATIONS

Japanese Office Action (and English translation thereof) dated Sep. 29, 2015, issued in counterpart Japanese Application No. 2011-227114.
(Continued)

*Primary Examiner* — Wyatt Stoffa
(74) *Attorney, Agent, or Firm* — Holtz, Holtz & Volek PC

(57) ABSTRACT

A scanning probe microscope includes a cantilever having a probe at a free end thereof; a scanner to three-dimensionally relatively move the probe and a sample; a vibrator to vibrate the cantilever based on a vibrating signal; a displacement detector to detect a displacement of the cantilever and to output a displacement signal indicating the displacement; and a phase difference information detecting section to generate a phase signal including information of a phase difference between the vibrating signal and the displacement signal. The phase difference information detecting section includes a phase regulating portion to provide, to the phase difference, a phase offset to cancel an initial phase difference
(Continued)

present in a state in which the probe is not in contact with the sample.

12 Claims, 27 Drawing Sheets

Related U.S. Application Data continuation of application No. PCT/JP2012/075688, filed on Oct. 3, 2012.

(51) Int. Cl.
  *G01Q 60/32* (2010.01)
  *B82Y 35/00* (2011.01)

(56) References Cited

U.S. PATENT DOCUMENTS

| | | | |
|---|---|---|---|
| 7,836,757 B2 | 11/2010 | Kitamura | |
| 8,387,159 B2 | 2/2013 | Fukuma et al. | |
| 9,453,856 B2* | 9/2016 | Sakai | G01Q 20/00 |
| 2002/0062684 A1* | 5/2002 | Adderton | B82Y 35/00 73/105 |
| 2006/0191329 A1* | 8/2006 | Adderton | B82Y 35/00 73/105 |
| 2006/0272399 A1* | 12/2006 | Su | B82Y 35/00 73/105 |
| 2007/0157711 A1* | 7/2007 | Bocek | B82Y 35/00 73/105 |
| 2008/0011065 A1* | 1/2008 | Su | G01Q 10/045 73/105 |
| 2008/0140343 A1* | 6/2008 | Roover | G01Q 10/06 702/168 |
| 2008/0229813 A1* | 9/2008 | Kitamura | G01Q 10/065 73/105 |
| 2008/0295584 A1* | 12/2008 | Cantrell | G01Q 60/32 73/105 |
| 2008/0307864 A1* | 12/2008 | Uchihashi | G01Q 60/32 73/105 |
| 2009/0139315 A1* | 6/2009 | Wang | G01Q 10/065 73/105 |
| 2009/0261249 A1* | 10/2009 | Kobayashi | G01Q 60/32 250/306 |
| 2010/0024082 A1* | 1/2010 | Ando | G01Q 10/065 850/33 |
| 2010/0031404 A1 | 2/2010 | Rychen | |
| 2010/0128342 A1* | 5/2010 | Abramovitch | G01Q 10/065 359/325 |
| 2011/0030109 A1* | 2/2011 | Saito | G01Q 60/54 850/5 |
| 2012/0151637 A1* | 6/2012 | Fukuma | B82Y 35/00 850/1 |

FOREIGN PATENT DOCUMENTS

| | | |
|---|---|---|
| JP | 2008232984 A | 10/2008 |
| JP | 2010512518 A | 4/2010 |
| WO | 2007072706 A1 | 6/2007 |
| WO | 2008015916 A1 | 2/2008 |
| WO | 2010023811 A1 | 3/2010 |

OTHER PUBLICATIONS

Japanese Office Action (and English translation thereof) dated Sep. 29, 2015, issued in counterpart Japanese Application No. 2011-227115.

Extended European Search Report dated Apr. 23, 2015, issued in counterpart European Application No. 12839241.2.

Anczykowski, et al., "How to measure energy dissipation in dynamic mode atomic force microscopy", Applied Surface Science, vol. 140, No. 3-4, Feb. 1, 1999, pp. 376-382.

International Preliminary Report on Patentability (IPRP) dated Apr. 24, 2014 (in English) issued in International Application No. PCT/JP2012/075688.

International Search Report (ISR) dated Dec. 18, 2012 (and English translation thereof) issued in International Application No. PCT/JP2012/075688.

\* cited by examiner

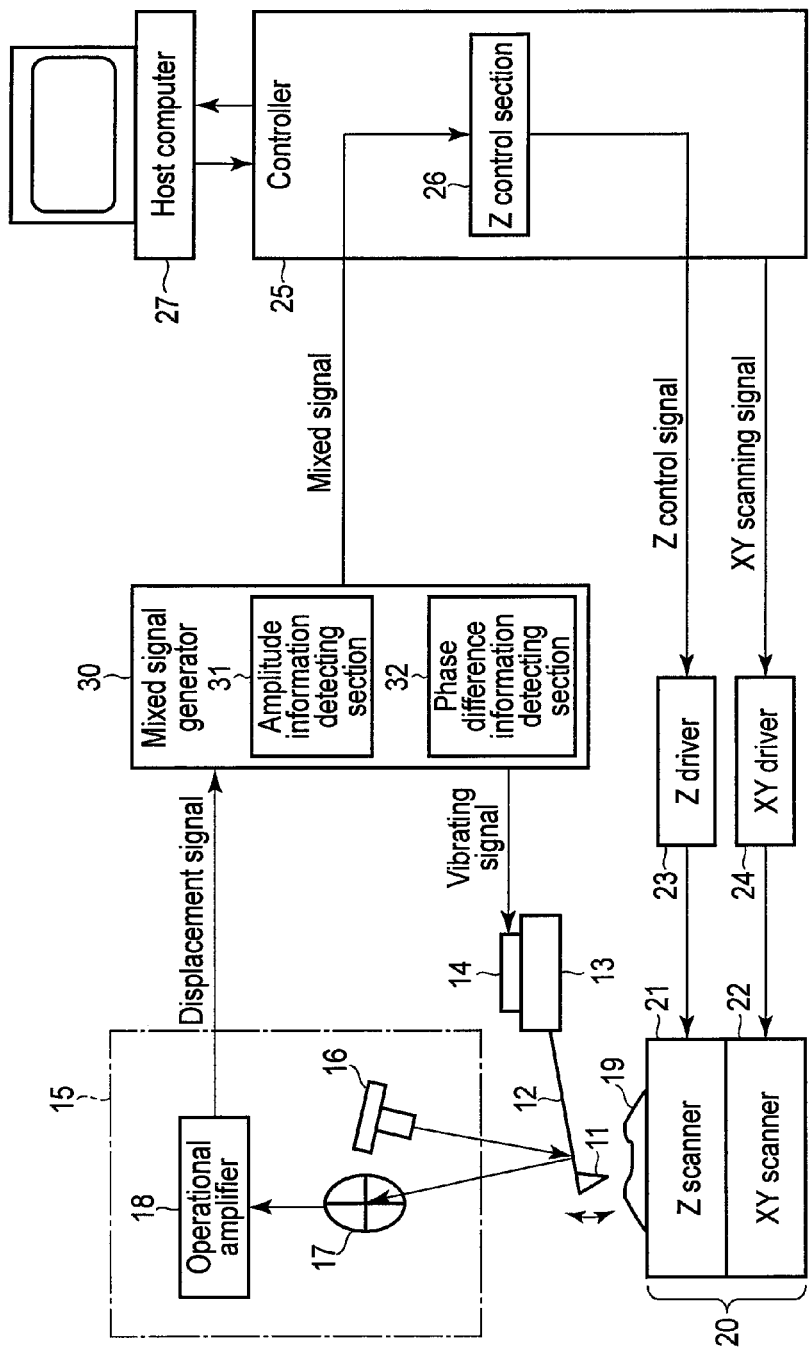
F I G. 1

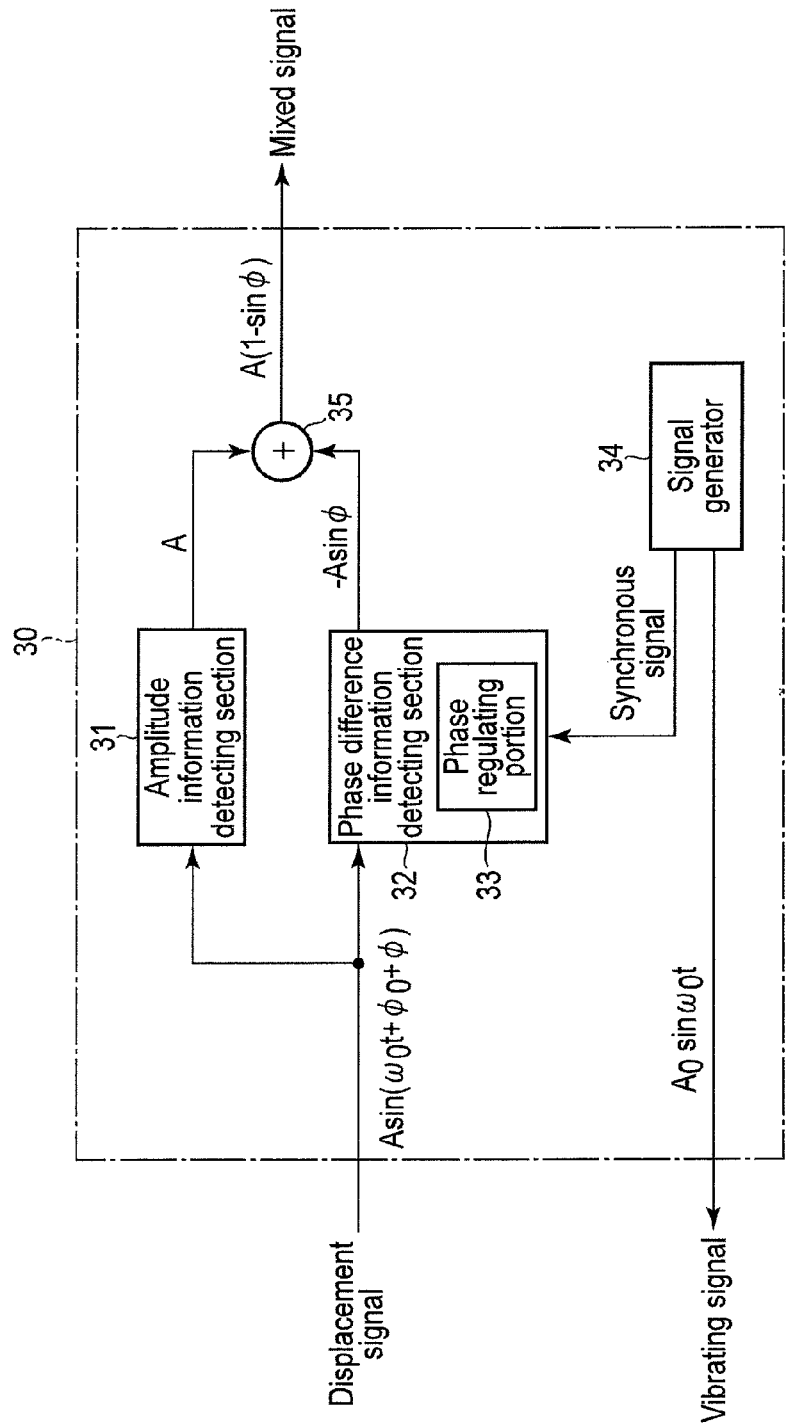
F I G. 2

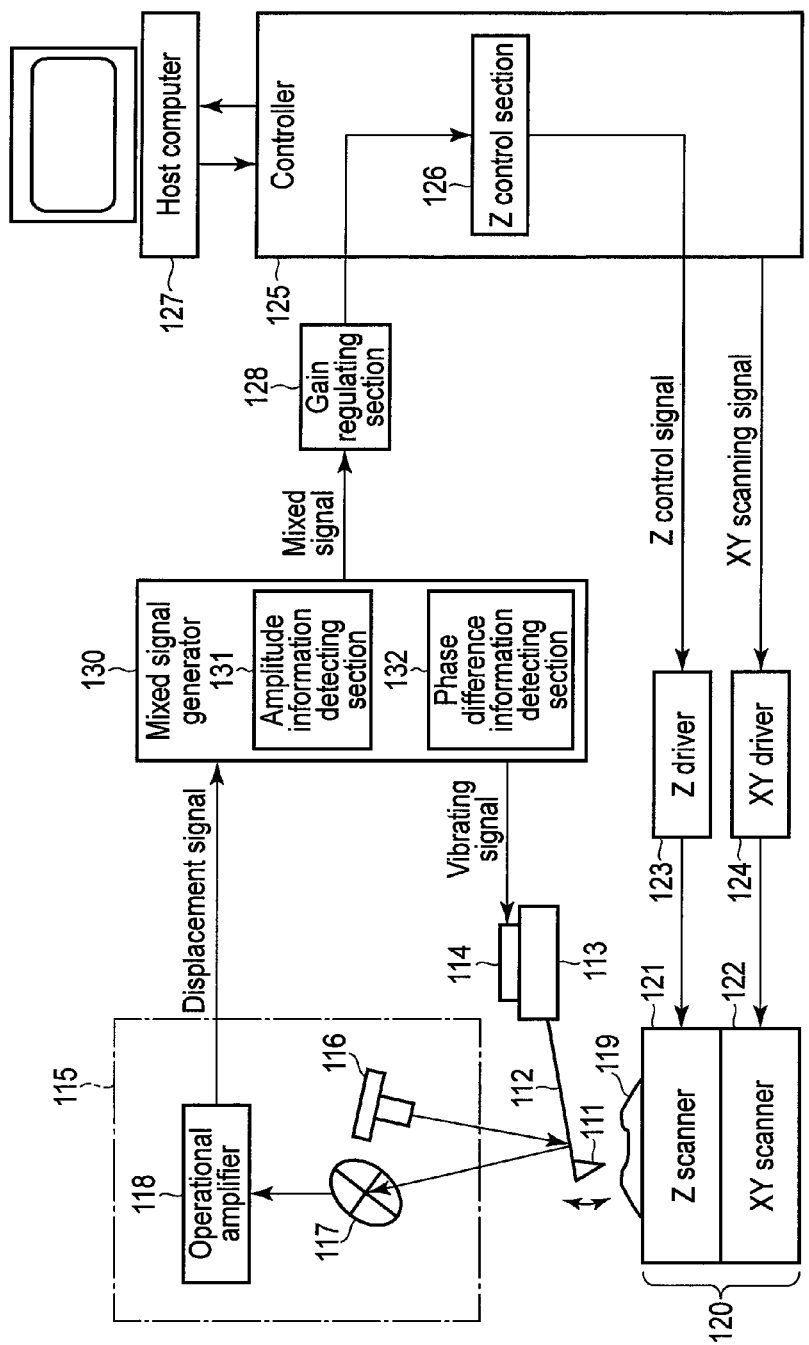
F I G. 7

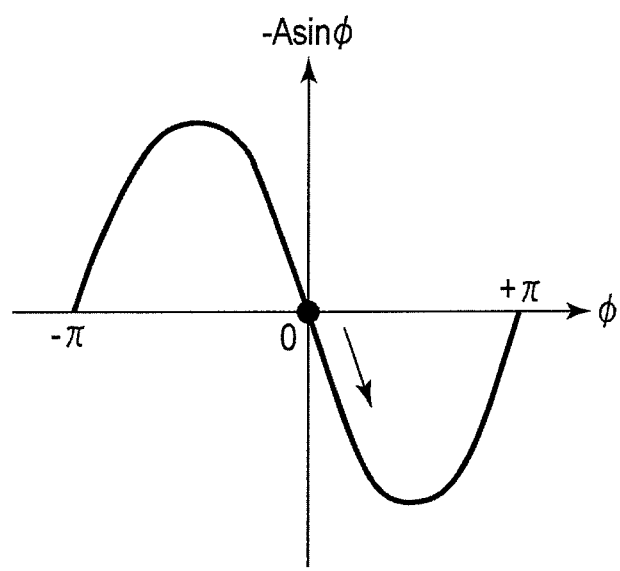
F I G. 9

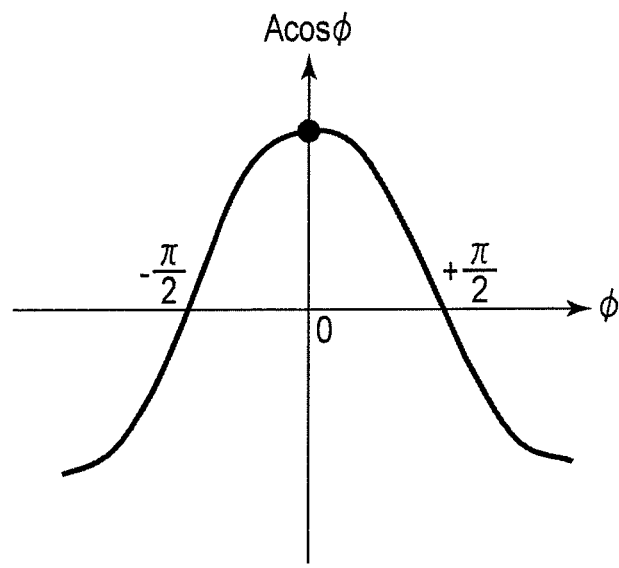
F I G. 12
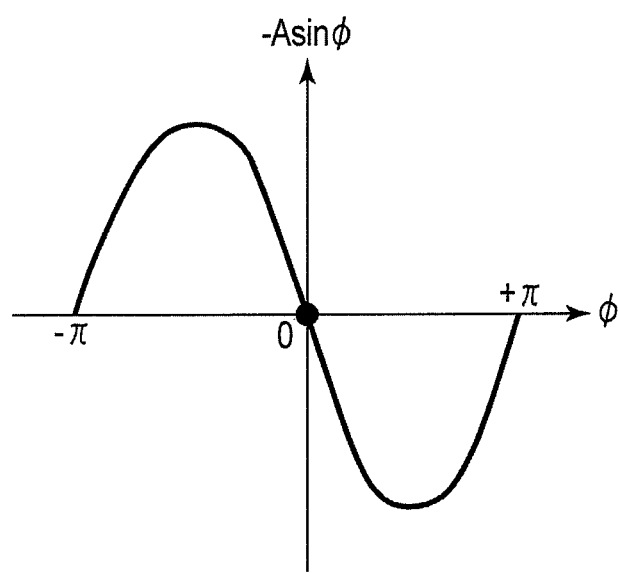
F I G. 13

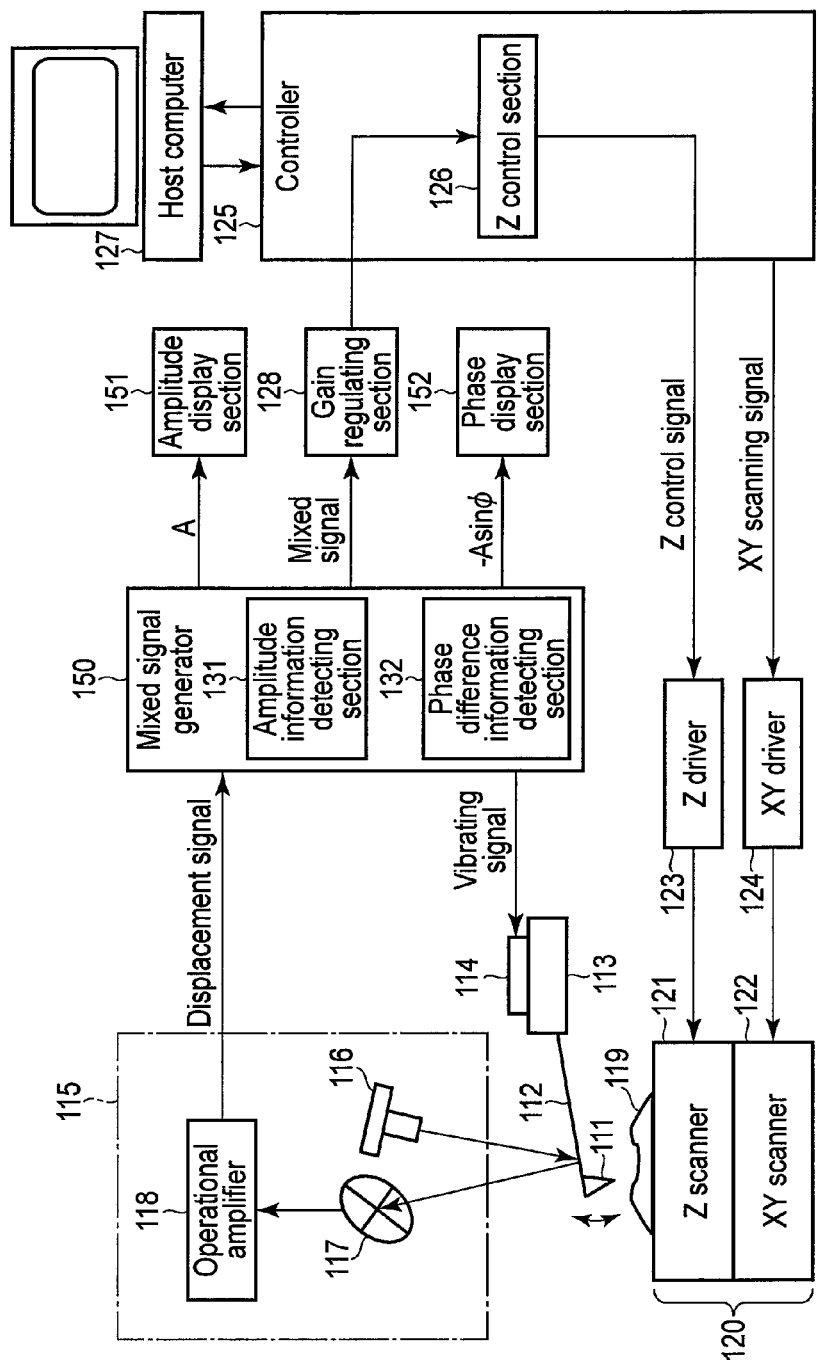
F I G. 14

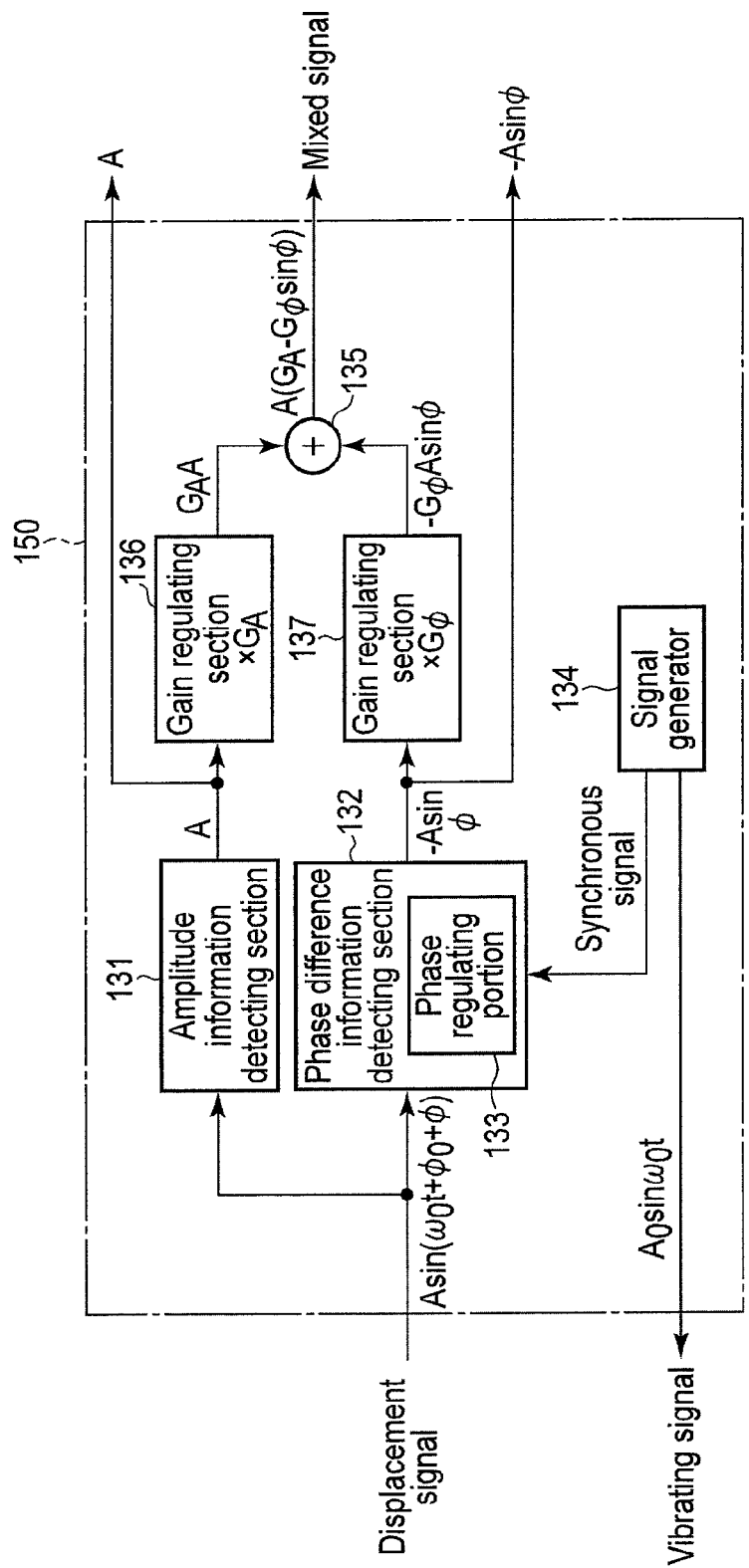
F I G. 15

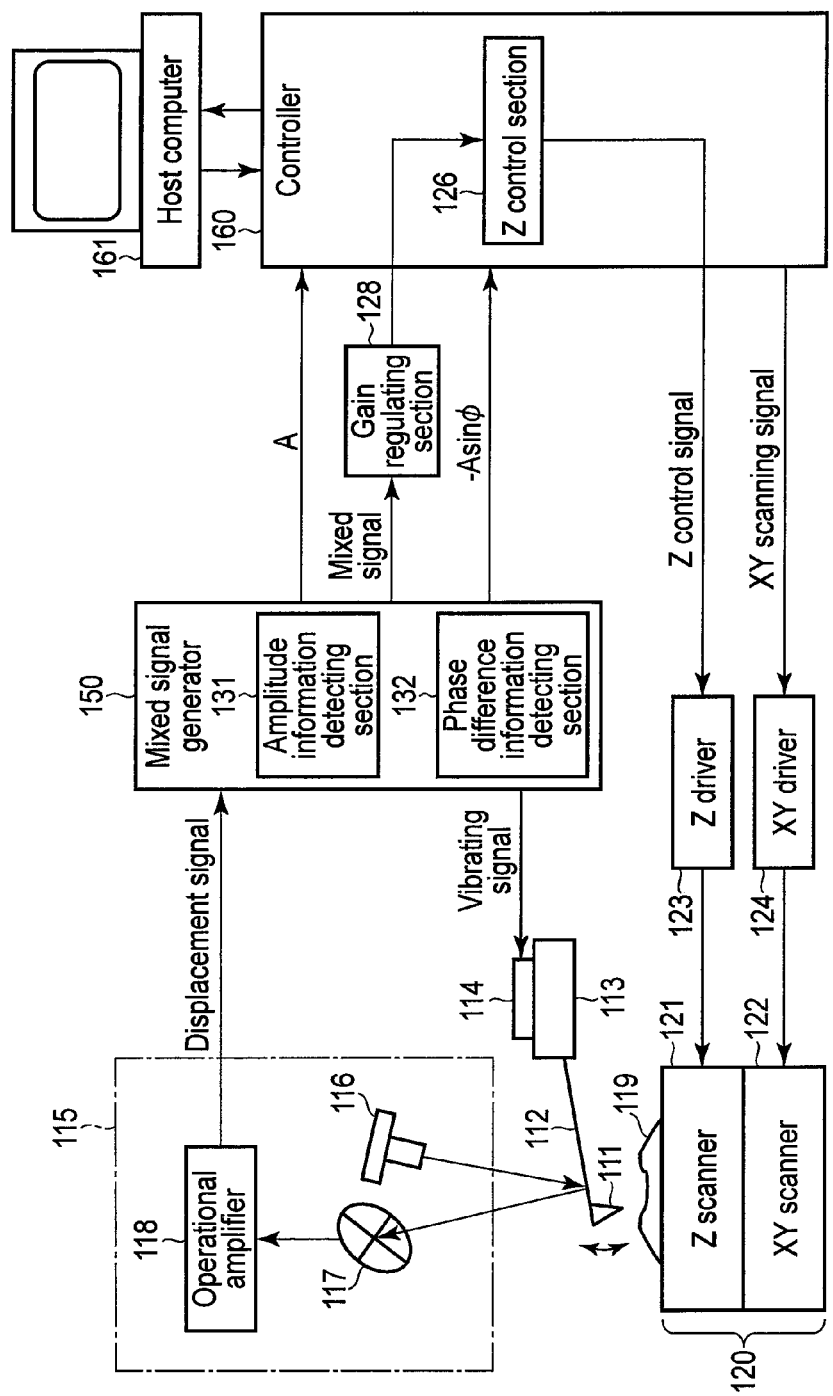
F I G. 16

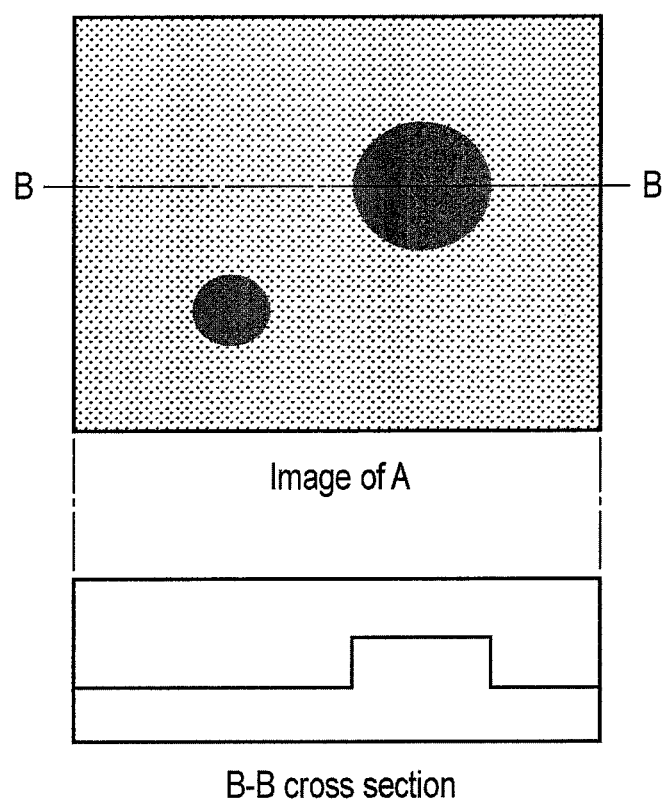
F I G. 18

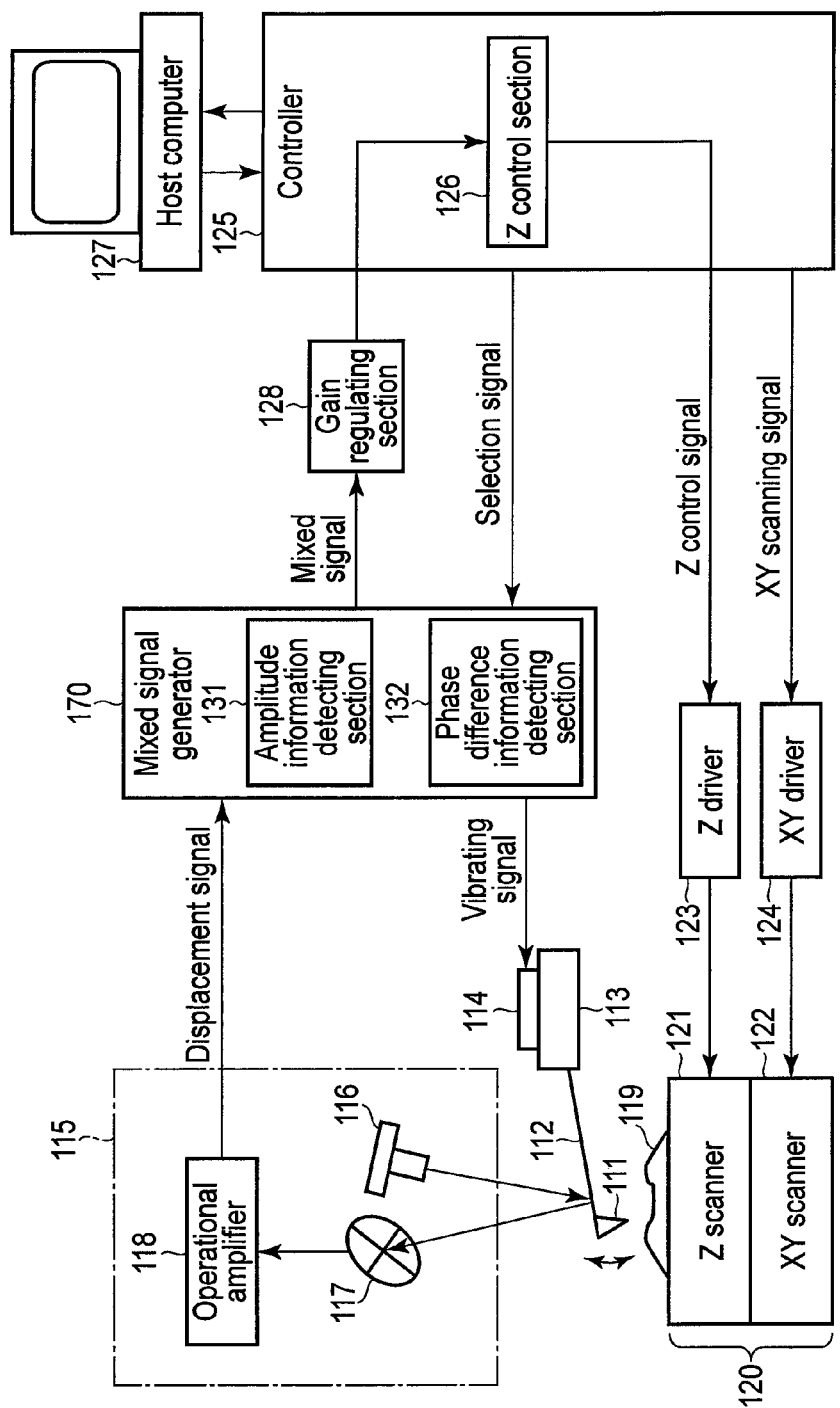
F I G. 20

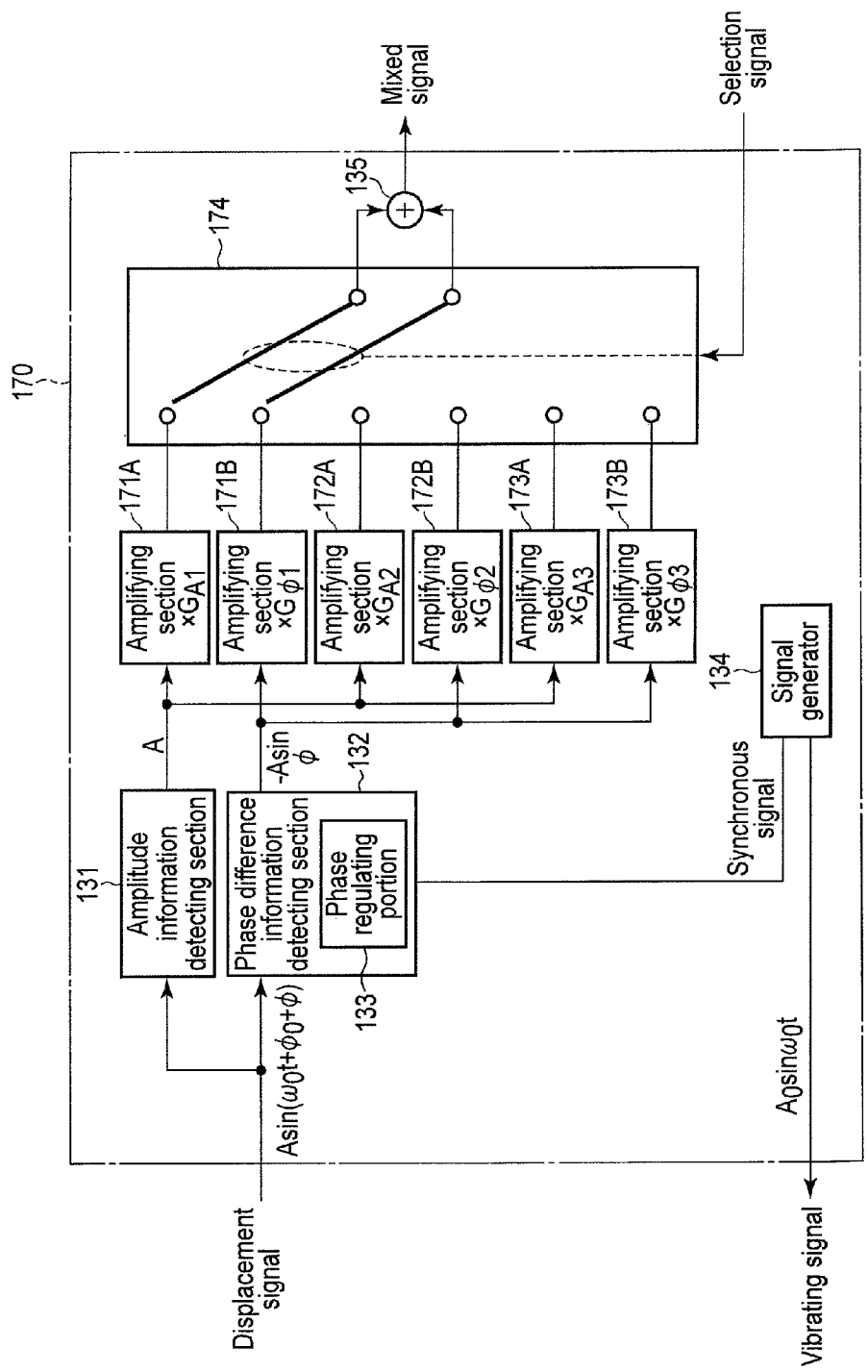
F I G. 21

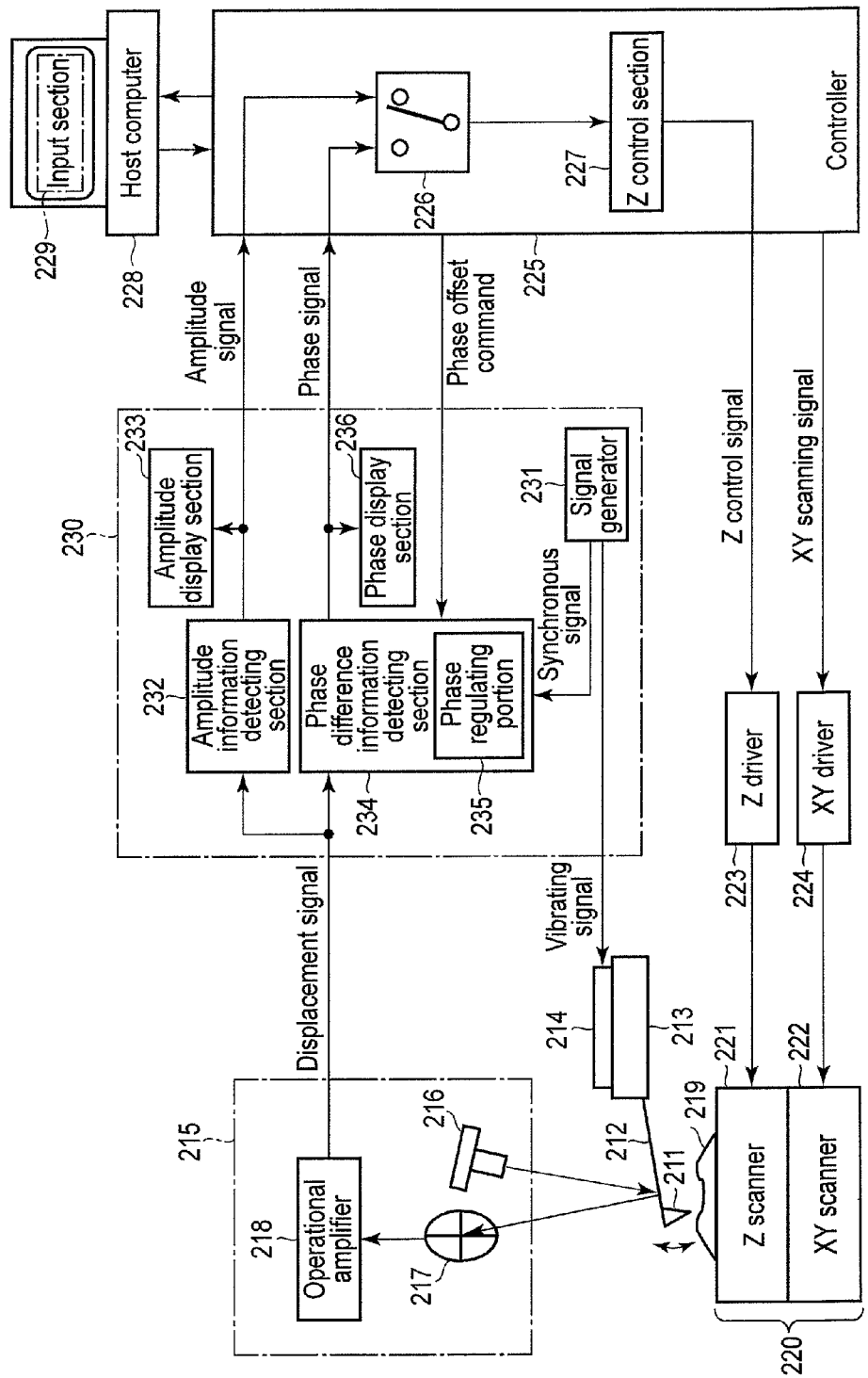
F I G. 23

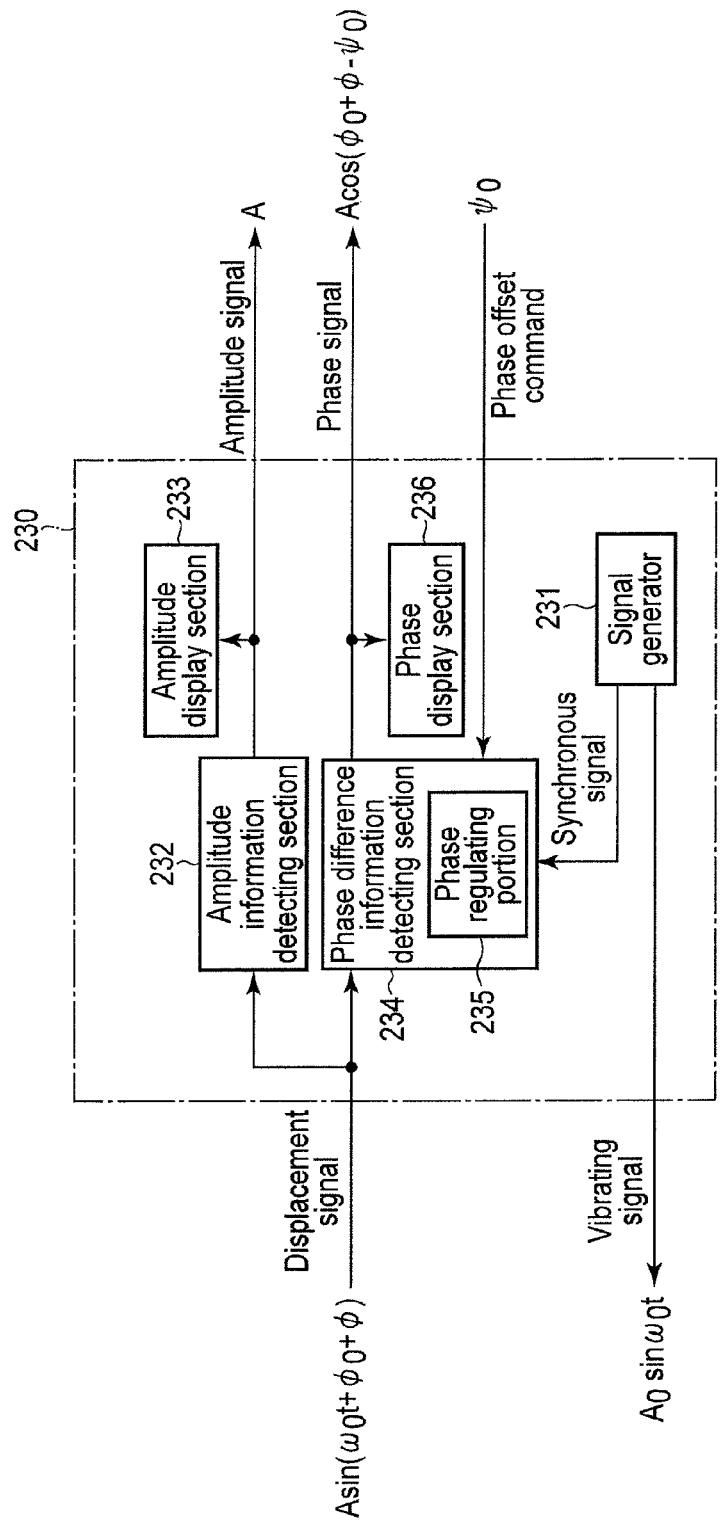
F I G. 24

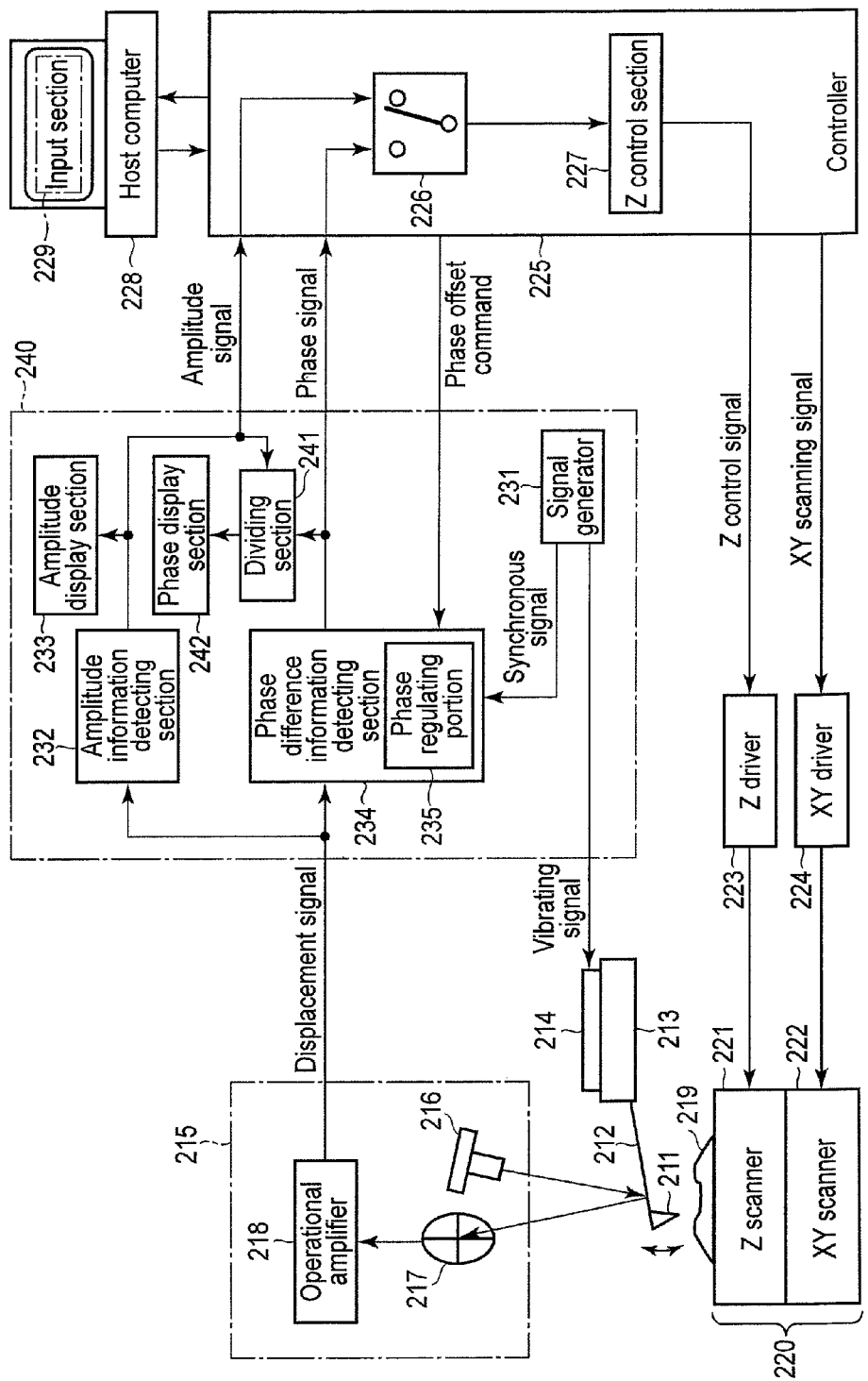
F I G. 27

SCANNING PROBE MICROSCOPE AND CONTROL METHOD THEREOF

CROSS-REFERENCE TO RELATED APPLICATIONS

This application is a Divisional application of U.S. Ser. No. 14/251,154, filed Apr. 11, 2014, which is a Continuation Application of PCT Application No. PCT/JP2012/075688, filed Oct. 3, 2012 and based upon and claiming the benefit of priority from prior Japanese Patent Applications No. 2011-227114, filed Oct. 14, 2011, No. 2011-227115, filed Oct. 14, 2011, and No. 2012-105185, filed May 2, 2012, the entire contents of all of which are incorporated herein by reference.

BACKGROUND

1. Field of the Invention

The present invention relates to a scanning probe microscope.

2. Description of the Related Art

A scanning probe microscope (SPM) is a generic name of a scanning microscope in which scanning is performed with a mechanical probe to acquire information of the surface of a sample, whereby mapping display is done. The SPMs include a scanning tunneling microscope (STM), an atomic force microscope (AFM), a scanning magnetic force microscope (MFM), a scanning near field optical microscopy (SNOM), and the like.

Among the SPMs, the AFM is used most extensively, and comprises, as main elements, a cantilever having a mechanical probe at its free end, an optical displacement sensor to detect a displacement of the cantilever, and a scanning mechanism in which a mechanical probe and a sample are relatively scanned. As the optical displacement sensor, an optical lever type optical displacement sensor is used most extensively, because of simple constitution and nevertheless high detection sensitivity. In this optical lever type optical displacement sensor, a light beam having a diameter of several μm to several tens μm is applied onto the cantilever, and a change in a reflection direction of reflected light corresponding to a change of a warp of the cantilever is caught by a two-divided optical detector or the like, to output an electronic signal in response to a behavior of the mechanical probe at the free end of the cantilever. According to the AFM, relative positions of the mechanical probe and the sample are scanned in XY directions by the scanning mechanism, while a relative distance between the mechanical probe and the sample is controlled in a Z direction so that the output of the optical displacement sensor is constant, whereby a rough state on the surface of the sample is brought into mapping and displayed on a monitor of a computer.

In the AFM, a mode (an AC mode) is often employed wherein the cantilever is vibrated, and on the basis of the resultant vibration properties, an interaction caused between the sample and the probe is inspected. This is for an advantage of the AC mode that a power caused between the sample and the probe can be kept more weakly as compared with a usual mode (which is called a contact mode). In this AC mode AFM, the vibration of the cantilever caused by the interaction between the sample and the probe, i.e., one of an amplitude change and a phase change of a displacement is detected, and on the basis of the detected results, a surface shape of the sample is determined.

Jpn. Pat. Appln. KOKAI Publication No. 2008-232984 discloses one of this type of AC mode AFMs. This AC mode AFM is constituted to switch one of an amplitude change and a phase change, followed by detection.

SUMMARY

A scanning probe microscope according to the present invention comprises a cantilever having a probe at a free end thereof, a scanner to three-dimensionally relatively move the probe and a sample, a vibrator to vibrate the cantilever on the basis of a vibrating signal, and a displacement detector to detect a displacement of the cantilever and output a displacement signal indicating the displacement. The scanning probe microscope further comprises a mixed signal generator including an amplitude information detecting section (detector) to detect amplitude information of the displacement signal and output an amplitude signal including the amplitude information, and a phase difference information detecting section (detector) to detect phase difference information between the vibrating signal and the displacement signal and output a phase signal including the phase difference information, to generate a mixed signal of the amplitude signal and the phase signal. The scanning probe microscope further comprises a controller to control a distance between the probe and the sample on the basis of the mixed signal.

EFFECT OF THE INVENTION

According to the present invention, there is provided a scanning probe microscope capable of accurately and stably determining even a surface shape of a sample in which a hard portion and a soft portion are mixed.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 1 shows a constitution of a scanning probe microscope of a first embodiment;

FIG. 2 shows a constitution of a mixed signal generator in the first embodiment;

FIG. 7 shows a constitution of a scanning probe microscope of a third embodiment;

FIG. 9 shows a relation between $-A \sin \varphi$ and $\varphi$;

FIG. 12 shows a relation between A cos φ and φ;

FIG. 13 shows a relation between −A sin φ and φ;

FIG. 14 shows a constitution of a scanning probe microscope of a fifth embodiment;

FIG. 15 shows a constitution of a mixed signal generator in the fifth embodiment;

FIG. 16 shows a modification of the scanning probe microscope of the fifth embodiment;

FIG. 18 shows an information display example (an image of A) in the scanning probe microscope of the fifth embodiment;

FIG. 20 shows a constitution of a scanning probe microscope of a sixth embodiment;

FIG. 21 shows a constitution example of a mixed signal generator in the sixth embodiment;

FIG. 23 shows a constitution of a scanning probe microscope of a seventh embodiment;

FIG. 24 shows a flow of signals in a signal processing section of FIG. 23;

FIG. 27 shows a constitution of a scanning probe microscope of an eighth embodiment;

DESCRIPTION OF THE PREFERRED EMBODIMENT

Figure 3:
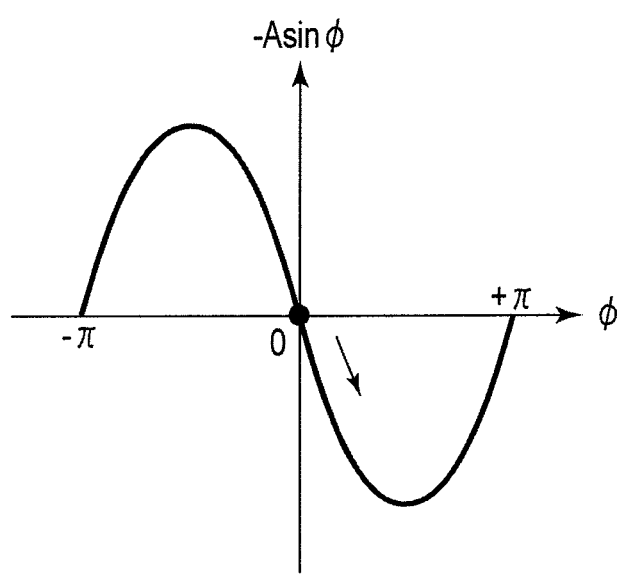
FIG. 3 shows a relation between $-A \sin \varphi$ and $\varphi$.

Hereinafter, embodiments of the present invention will be described with reference to the drawings.

<First Embodiment>

A constitution of a scanning probe microscope of the present embodiment is shown in FIG. 1. As shown in FIG. 1, the scanning probe microscope includes a cantilever 12 having a probe 11 at a free end thereof. The cantilever 12 may be held by a holder 13 to correctly face a sample 19.

The scanning probe microscope also includes a displacement detector 15 to detect a displacement of the cantilever 12 and output a displacement signal indicating the displacement. The displacement detector 15 is constituted of an optical lever type optical displacement sensor, and comprises a laser light source 16 to apply focused laser light onto a back surface of the cantilever 12, a divided detector 17 to receive the laser light reflected from the back surface of the cantilever 12, and an operational amplifier 18 to generate the displacement signal of the cantilever 12 from an output of the divided detector 17.

The scanning probe microscope also includes a vibrator 14 to vibrate the cantilever 12 on the basis of a vibrating signal, and a mixed signal generator 30 to supply the vibrating signal to the vibrator 14. The vibrator 14 is disposed in, for example, the holder 13. The vibrator 14, which may be constituted of, for example, a piezoelectric element, may vibrate the cantilever 12 with a predetermined amplitude at a frequency in the vicinity of a mechanical resonance frequency of the cantilever. The mixed signal generator 30 outputs the vibrating signal and further, may generate a mixed signal from the displacement signal output from the displacement detector 15. Details of the mixed signal will be described later.

The scanning probe microscope also includes a scanner 20 to three-dimensionally relatively move the sample 19 and the probe 11. The scanner 20 is constituted of a Z scanner 21 and an XY scanner 22. The Z scanner 21 is disposed on the XY scanner 22, and on the Z scanner 21, the sample 19 may be mounted via an unshown sample base. The Z scanner 21 is driven by a Z driver 23, so that the sample 19 may be moved to the probe 11 in a Z direction. Furthermore, the XY scanner 22 is driven by an XY driver 24, so that the sample 19 may be moved to the probe 11 in XY directions.

The scanning probe microscope also includes a controller 25 to control the Z driver 23 and the XY driver 24, and a host computer 27 to form an image of the surface of the sample 19. The controller 25 may generate an XY scanning signal to two-dimensionally scan the probe 11 along the surface of the sample 19, and a Z control signal to control a distance between the probe 11 and the sample 19. The controller 25 includes a Z control section 26 to generate the Z control signal from the mixed signal. The host computer 27 may form the image of the surface of the sample 19 by use of the XY scanning signal and the Z control signal generated by the controller 25.

A constitution of the mixed signal generator 30 is shown in FIG. 2. As shown in FIG. 2, the mixed signal generator 30 is constituted of a signal generator 34, an amplitude information detecting section 31, a phase difference information detecting section 32, and a calculating section 35.

The signal generator 34 generates the vibrating signal to vibrate the cantilever 12 with the predetermined amplitude at the frequency in the vicinity of the mechanical resonance frequency of the cantilever, and outputs this signal to the vibrator 14. The signal generator 34 also outputs asynchronous signal synchronized with the vibrating signal to the phase difference information detecting section 32. This synchronous signal may be constituted of, for example, a square wave signal (a logic signal) of the same frequency and the same phase as in the vibrating signal.

The amplitude information detecting section 31 generates and outputs an amplitude signal including information of an amplitude of the displacement signal of the cantilever 12 supplied from the displacement detector 15.

The phase difference information detecting section 32 generates and outputs a phase signal including information of a phase difference between the displacement signal of the cantilever 12 supplied from the displacement detector 15 and the synchronous signal supplied from the signal generator 34. The synchronous signal and the vibrating signal have the same frequency and the same phase, and hence the phase difference between the displacement signal and the synchronous signal is equivalent to a phase difference between the displacement signal and the vibrating signal.

The phase difference information detecting section 32 comprises a phase regulating portion 33 capable of regulating a phase of the synchronous signal supplied from the signal generator 34. The phase regulating portion 33 may provide a desirable phase offset to the phase of the synchronous signal supplied from the signal generator 34. Therefore, the phase regulating portion 33 may provide the desirable phase offset to the phase difference between the displacement signal and the synchronous signal. The phase difference information detecting section 32 generates and outputs a phase signal including information of the phase difference between the synchronous signal and the displacement signal to which the phase offset is provided. The phase difference between the synchronous signal to which the phase offset is provided and the displacement signal is equivalent to the phase difference between the displacement signal and the synchronous signal, to which the phase offset is provided.

The calculating section 35 performs addition processing of the amplitude signal supplied from the amplitude information detecting section 31 and the phase signal supplied from the phase difference information detecting section 32, and outputs the processing result as the mixed signal. Here, the amplitude signal and the phase signal may be negative signals. That is, the addition processing includes processing of subtraction of a narrow sense.

Here, signal processing of the mixed signal generator 30 is described in detail.

Assume that the vibrating signal is $A_0 \sin \omega_0 t$. Where, $A_0$ is an amplitude of the vibrating signal, $\omega_0$ is an angular vibration frequency of the vibrating signal, and t is time. When the resonance frequency of the cantilever 12 is $f_0$, $\omega_0$ has a value substantially equal to $2\pi \cdot f_0$.

Assume that the synchronous signal is, for example, a square wave signal of the same frequency (i.e., the angular vibration frequency $\omega_0$) and the same phase as in the vibrating signal.

Assume that the displacement signal of the cantilever 12 is $A \sin(\omega_0 t+\varphi_0+\varphi)$. Where, A is the amplitude of the displacement signal, $\varphi_0$ is an initial phase difference between the displacement signal and the vibrating signal (the synchronous signal), which is present in a state where the probe 11 is not in contact with the sample 19, and $\varphi_0$ is a phase difference between the displacement signal and the vibrating signal (the synchronous signal), which is caused by the contact of the probe 11 with the sample 19. Hereinafter, for the sake of convenience, this phase difference will be called a phase shift amount. When the probe 11 is not in contact with the sample 19, $\varphi$ is 0. A and $\varphi$ are detection objects.

The phase regulating portion 33 provides a phase offset $\psi$ to the phase of the synchronous signal output from the signal generator 34. That is, the phase regulating portion 33 shifts the phase of the synchronous signal as much as $\psi$. This is equivalent to providing a phase offset $(-\psi)$ to the phase difference between the displacement signal of the cantilever 12 and the synchronous signal (i.e., the vibrating signal). The phase difference information detecting section 32 generates and outputs a phase signal $A \cos(\varphi_0+\varphi-\psi)$ including information of the phase difference between the displacement signal $A \sin(\omega_0 t+\varphi_0+\varphi)$ of the cantilever 12 and the synchronous signal to which the phase offset $\psi$ is provided.

Preferably, the phase regulating portion 33 shifts the phase of the synchronous signal as much as $(\varphi_0-\pi/2)$. That is, $\psi=\varphi_0-\pi/2$. In this case, the phase signal output from the phase difference information detecting section 32 is $A \cos\{\varphi_0+\varphi-(\varphi_0-\pi/2)\}=-A \sin \varphi$.

FIG. 3 is a graph showing a relation between $-A \sin \varphi$ and $\varphi$. As seen from this graph, $-A \sin \varphi$ is most sensitive (has a high sensitivity) to a change of the phase shift amount $\varphi$ in $\varphi=0$.

When a measurement portion is hard, the amplitude of the displacement signal of the cantilever 12 more noticeably changes than the phase thereof. This amplitude decreases as a repulsive force acting between the sample 19 and probe 11 enlarges. Conversely, when the measurement portion is soft, the phase of the displacement signal of the cantilever 12 more noticeably changes than the amplitude thereof. This phase advances (shifts in a direction of $+\varphi$) as the repulsive force acting between the sample 19 and the probe 11 enlarges. Therefore, the phase signal output from the phase difference information detecting section 32 preferably sensitively changes near $\varphi=0$, and also preferably decreases in accordance with the change of the amplitude, as $\varphi$ advances. For such a reason, the phase offset $\psi$ is preferably set to $\psi=\varphi_0-\pi/2$ so that the phase signal $A \cos(\varphi_0+\varphi-\psi)$ turns to $(-A \sin \varphi)$.

As seen again with reference to FIG. 2, the amplitude information detecting section 31 detects the amplitude A of the displacement signal $A \sin(\omega_0 t+\varphi_0+\varphi)$ of the cantilever 12, and outputs the amplitude signal A indicating the amplitude of the displacement signal.

The calculating section 35 performs the addition processing of the amplitude signal (A) and the phase signal ($-A \sin \varphi$) to calculate ($A-A \sin \varphi$), and outputs this signal as the mixed signal.

As shown in FIG. 1, the mixed signal output from the calculating section 35 is supplied to the Z control section 26 in the controller 25. The Z control section 26 generates the Z control signal to control the distance between the sample 19 and the probe 11 so that the mixed signal is kept to be constant, and the section supplies this signal to the Z driver 23. The Z driver 23 controls the Z scanner 21 in accordance with the Z control signal to be supplied. As a result, the distance between the sample 19 and the probe 11 is controlled so that the mixed signal is kept to be constant.

The controller 25 generates the XY scanning signal to two-dimensionally scan the probe 11 along the surface of the sample 19, and supplies this signal to the XY driver 24. The XY driver 24 controls the XY scanner 22 in accordance with the XY scanning signal to be supplied. As a result, the probe 11 is two-dimensionally scanned along the surface of the sample 19.

The controller 25 also supplies the XY scanning signal and the Z control signal to the host computer 27. The host computer 27 forms the image of the surface of the sample 19 by use of the XY scanning signal and the Z control signal, and displays the image, or stores data of the image.

In the scanning probe microscope of the present embodiment, the repulsive force working between the sample 19 and the probe 11 is detected as the mixed signal ($A-A \sin \varphi$), and on the basis of the signal, the distance between the sample 19 and the probe 11 is controlled. When the measurement portion is hard, the amplitude signal A noticeably changes, and when the measurement portion is soft, the phase signal ($-A \sin \varphi$) noticeably changes. Therefore, even when the hard portion and the soft portion are mixed in the sample 19, the repulsive force working between the sample 19 and the probe 11 to both of the portions can sensitively be detected. As a result, even a surface shape of the sample in which the hard portion and the soft portion are mixed can accurately and stably be determined.

<Second Embodiment>

A scanning probe microscope of the present embodiment is the same as the scanning probe microscope of the first embodiment except that a constitution of a mixed signal generator is different. Therefore, here, description will be made while importance is placed on the constitution and a function of the mixed signal generator of the present embodiment.

Figure 4:
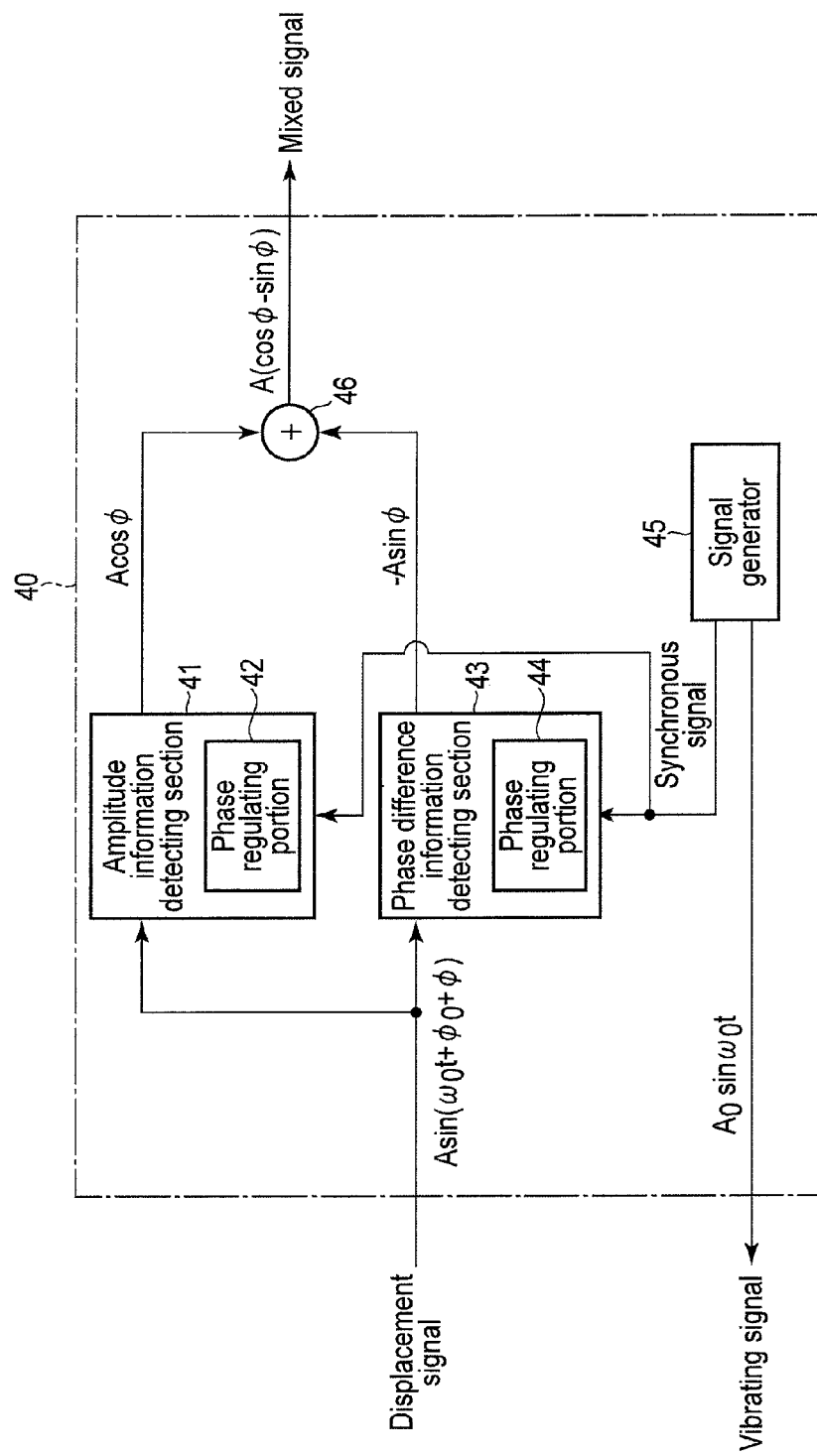
FIG. 4 shows a constitution of a mixed signal generator in a second embodiment.

FIG. 4 shows a constitution of a mixed signal generator 40 of the present embodiment. As shown in FIG. 4, the mixed signal generator 40 is constituted of a signal generator 45, an amplitude information detecting section 41, a phase difference information detecting section 43, and a calculating section 46.

The signal generator 45 generates a vibrating signal to vibrate a cantilever 12 with a predetermined amplitude at a frequency in the vicinity of a mechanical resonance frequency of the cantilever, and outputs the signal to a vibrator 14. The signal generator 45 also outputs a synchronous signal synchronized with the vibrating signal to the amplitude information detecting section 41 and the phase difference information detecting section 43. This synchronous signal may be constituted of, for example, a square wave signal (a logic signal) of the same frequency and the same phase as in the vibrating signal.

The amplitude information detecting section 41 generates and outputs an amplitude signal including information of an amplitude of a displacement signal of the cantilever 12 supplied from a displacement detector 15.

The amplitude information detecting section 41 comprises a phase regulating portion 42 capable of regulating a phase of asynchronous signal supplied from the signal generator 45. The phase regulating portion 42 may provide a desirable phase offset to the phase of the synchronous signal supplied from the signal generator 45. Therefore, the phase regulating portion 42 may provide a desirable phase offset to a phase difference between the displacement signal and the synchronous signal. The amplitude information detecting section 41 outputs, as the amplitude signal, a first phase difference signal including information of the phase difference between the synchronous signal and the displacement signal, to which the phase offset is provided. For reasons described later, the first phase difference signal can be regarded as the amplitude signal including information of the amplitude of the displacement signal.

The phase difference information detecting section 43 generates and outputs a phase signal including information of the phase difference between the displacement signal of the cantilever 12 supplied from the displacement detector 15 and the synchronous signal supplied from the signal generator 45.

The phase difference information detecting section 43 comprises a phase regulating portion 44 capable of regulating the phase of the synchronous signal supplied from the signal generator 45. The phase regulating portion 44 may provide a desirable phase offset to the phase of the synchronous signal supplied from the signal generator 45. Therefore, the phase regulating portion 44 may provide the desirable phase offset to the phase difference between the displacement signal and the synchronous signal. The phase difference information detecting section 43 outputs, as the phase signal, a second phase difference signal including information of the phase difference between the synchronous signal and the displacement signal to which the phase offset is provided.

Here, the synchronous signal and the vibrating signal have the same frequency and the same phase, and hence the phase difference between the displacement signal and the synchronous signal is equivalent to a phase difference between the displacement signal and the vibrating signal. Furthermore, the phase difference between the synchronous signal to which the phase offset is provided and the displacement signal is equivalent to the phase difference between the displacement signal and the synchronous signal to which the phase offset is provided.

The calculating section 46 performs addition processing of the amplitude signal supplied from the amplitude information detecting section 41, i.e., the first phase difference signal and the phase signal supplied from the phase difference information detecting section 43, i.e., the second phase difference signal, and the section outputs the processing result as a mixed signal.

Here, signal processing of the mixed signal generator 40 is described in detail.

Assume that the vibrating signal is $A_0 \sin \omega_0 t$. Where, $A_0$ is an amplitude of the vibrating signal, $\omega_0$ is an angular vibration frequency of the vibrating signal, and t is time. When the resonance frequency of the cantilever 12 is $f_0$, $\omega_0$ has a value substantially equal to $2\pi \cdot f_0$.

Assume that the synchronous signal is, for example, a square wave signal of the same frequency (i.e., the angular vibration frequency $\omega_0$) and the same phase as in the vibrating signal.

Assume that the displacement signal of the cantilever 12 is $A \sin(\omega_0 t + \varphi_0 + \varphi)$. Where, A is the amplitude of the displacement signal, $\varphi_0$ is an initial value of a phase of the displacement signal when a probe 11 is not in contact with a sample 19, and $\varphi$ is a phase shift amount of the displacement signal caused by the contact of the probe 11 with the sample 19. When the probe 11 is not in contact with the sample 19, $\varphi$ is 0. A and $\varphi$ are detection objects.

The phase regulating portion 42 provides a phase offset $\psi_1$ to the phase of the synchronous signal output from the signal generator 45. That is, the phase regulating portion 42 shifts the phase of the synchronous signal as much as $\psi_1$. The amplitude information detecting section 41 generates and outputs, as an amplitude signal, the first phase difference signal $A \cos(\varphi_0 + \varphi - \psi_1)$ including the information of the phase difference between the displacement signal $A \sin(\omega_0 t + \varphi_0 + \varphi)$ of the cantilever 12 and the synchronous signal to which the phase offset $\psi_1$ is provided.

Preferably, the phase regulating portion 42 shifts the phase of the synchronous signal as much as $\varphi_0$. That is, $\psi_1 = \varphi_0$. In this case, the amplitude signal output from the amplitude information detecting section 41 is $A \cos(\varphi_0 + \varphi - \varphi_0) = A \cos \varphi$.

The phase regulating portion 44 provides a phase offset $\psi_2$ to the phase of the synchronous signal output from the signal generator 45. That is, the phase regulating portion 44 shifts the phase of the synchronous signal as much as $\psi_2$. The phase difference information detecting section 43 generates and outputs, as the phase signal, the second phase difference signal $A \cos(\varphi_0 + \varphi - \psi_2)$ including the information of the phase difference between the displacement signal $A \sin(\omega_0 t + \varphi_0 + \varphi)$ of the cantilever 12 and the synchronous signal to which the phase offset $\psi_2$ is provided.

Preferably, the phase regulating portion 44 shifts the phase of the synchronous signal as much as $(\varphi_0 - \pi/2)$. That is, $\psi_2 = \varphi_0 - \pi/2$. In this case, the phase signal output from the phase difference information detecting section 43 is $A \cos\{\varphi_0 + \varphi - (\varphi_0 - \pi/2)\} = -A \sin \varphi$.

Figure 5:
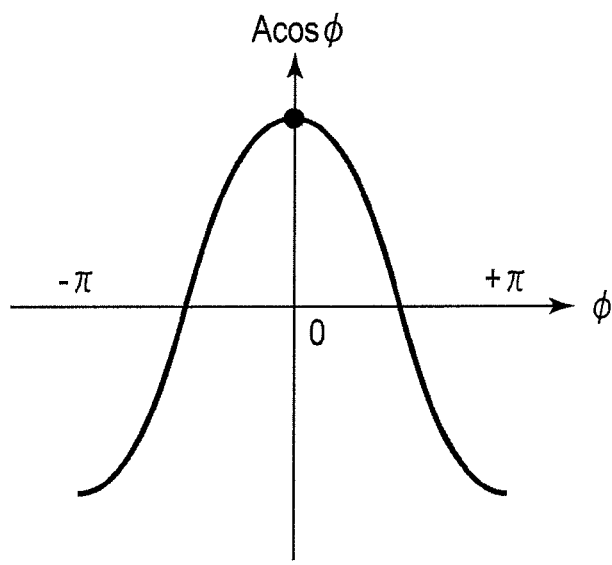
FIG. 5 shows a relation between $A \cos \varphi$ and $\varphi$.

FIG. 5 is a graph showing a relation between $A \cos \varphi$ and $\varphi$. As seen from this graph, $A \cos \varphi$ is most insensitive (has a low sensitivity) to a change of the phase shift amount $\varphi$ in $\varphi = 0$.

Figure 6:
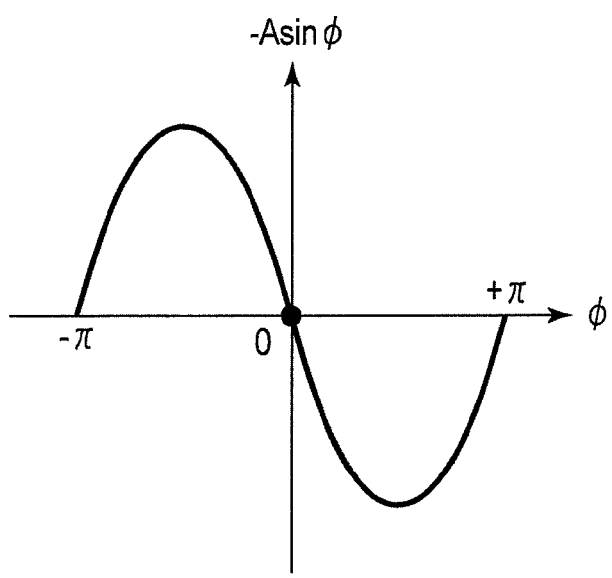
FIG. 6 shows a relation between $-A \sin \varphi$ and $\varphi$.

FIG. 6 is a graph showing a relation between $-A \sin \varphi$ and $\varphi$. As seen from this graph, $-A \sin \varphi$ is most sensitive (has a high sensitivity) to the change of the phase shift amount $\varphi$ in $\varphi = 0$, and decreases as the phase advances from 0. That is, the phase signal ($-A \sin \varphi$) decreases as a repulsive force working between the sample 19 and the probe 11 enlarges in the same manner as in the direction of the change of the amplitude signal.

Furthermore, as shown in FIG. 4, the calculating section 46 performs addition processing of the amplitude signal, i.e., the first phase difference signal $A \cos \varphi$ and the phase signal, i.e., the second phase difference signal ($-A \sin \varphi$) to calculate ($A \cos \varphi - A \sin \varphi$), and the section outputs this signal as the mixed signal.

In this case, when the measurement object is hard, i.e., when a change of the amplitude is larger than the phase shift amount $\varphi$ in the change amount of the signal,
$A \cos \varphi > -A \sin \varphi$, and
the signal of $A \cos \varphi$ dominantly works. Furthermore, when the change of $\varphi$ is small, $\cos \varphi \approx 1$, so that it can be considered that $A \cos \varphi \approx A$, i.e., $A \cos \varphi$ is about the same as A. Therefore, it can be considered that the first phase difference signal is the amplitude signal including the information of the amplitude of the displacement signal.

Furthermore, when the measurement object is soft, i.e., when the phase shift amount $\varphi$ is larger than the change of the amplitude, in the change amount of the signal,
$-A \sin \varphi > -A \cos \varphi$, and
the signal of $-A \sin \varphi$ dominantly works. At this time, the change of $\varphi$ is large, and hence the change of $A \cos \varphi$ is also larger than that in the first embodiment (the case of the only A).

The mixed signal output from the calculating section 46 is supplied to a Z control section 26 in a controller 25 as shown in FIG. 1. The Z control section 26 generates a Z control signal to control a distance between the sample 19 and probe 11 so that the mixed signal is kept to be constant, and the section supplies this signal to a Z driver 23. The Z driver 23 controls a Z scanner 21 in accordance with the Z control signal to be supplied. As a result, the distance between the sample 19 and the probe 11 is controlled so that the mixed signal is kept to be constant.

The controller 25 generates an XY scanning signal to two-dimensionally scan the probe 11 along the surface of the sample 19, and supplies this signal to an XY driver 24. The XY driver 24 controls an XY scanner 22 in accordance with the XY scanning signal to be supplied. As a result, the probe 11 is two-dimensionally scanned along the surface of the sample 19.

The controller 25 also supplies the XY scanning signal and the Z control signal to a host computer 27. The host computer 27 forms an image of the surface of the sample 19 by use of the XY scanning signal and the Z control signal, and displays the image, or stores data of the image.

In the scanning probe microscope of the present embodiment, the repulsive force working between the sample 19 and the probe 11 is detected as the mixed signal ($A \cos \varphi - A \sin \varphi$), and on the basis of the signal, the distance between the sample 19 and the probe 11 is controlled. When a measurement portion is hard, it can be considered that $A \cos \varphi$ is substantially A, and hence $A \cos \varphi$ noticeably changes. As a result, in the hard portion, the repulsive force working between the sample 19 and the probe 11 can be detected with the same degree of sensitivity as in the first embodiment. When the measurement portion is soft, $-A \sin \varphi$ noticeably changes, and $A \cos \varphi$ also changes. As a result, in the soft portion, the repulsive force working between the sample 19 and the probe 11 can be detected with a sensitivity higher than that of the first embodiment. As a result, even in the sample in which the hard portion and the soft portion are mixed, a surface shape thereof can accurately and stably be determined.

<Third Embodiment>

A constitution of a scanning probe microscope of the present embodiment is shown in FIG. 7. As shown in FIG. 7, the scanning probe microscope includes a cantilever 112 having a probe 111 at a free end thereof. The cantilever 112 may be held by a holder 113 to correctly face a sample 119.

The scanning probe microscope also includes a displacement detector 115 to detect a displacement of the cantilever 112 and output a displacement signal indicating the displacement. The displacement detector 115 is constituted of an optical lever type optical displacement sensor, and comprises a laser light source 116 to apply focused laser light onto a back surface of the cantilever 112, a divided detector 117 to receive the laser light reflected from the back surface of the cantilever 112, and an operational amplifier 118 to generate the displacement signal of the cantilever 112 from an output of the divided detector 117.

The scanning probe microscope also includes a vibrator 114 to vibrate the cantilever 112 on the basis of a vibrating signal, and a mixed signal generator 130 to supply the vibrating signal to the vibrator 114. The vibrator 114 is disposed in, for example, the holder 113. The vibrator 114, which may be constituted of, for example, a piezoelectric element, may vibrate the cantilever 112 with a predetermined amplitude at a frequency in the vicinity of a mechanical resonance frequency of the cantilever. The mixed signal generator 130 outputs the vibrating signal and further, may generate a mixed signal from the displacement signal output from the displacement detector 115. Details of the mixed signal will be described later. The scanning probe microscope also includes a mixed signal gain regulating section 128 capable of regulating a gain of the mixed signal output from the mixed signal generator 130.

The scanning probe microscope also includes a scanner 120 to three-dimensionally relatively move the sample 119 and the probe 111. The scanner 120 is constituted of a Z scanner 121 and an XY scanner 122. The Z scanner 121 is disposed on the XY scanner 122, and on the Z scanner 121, the sample 119 may be mounted via an unshown sample base. The Z scanner 121 is driven by a Z driver 123, so that the sample 119 may be moved to the probe 111 in a Z direction. Furthermore, the XY scanner 122 is driven by an XY driver 124, so that the sample 119 may be moved to the probe 111 in XY directions.

The scanning probe microscope also includes a controller 125 to control the Z driver 123 and the XY driver 124, and a host computer 127 to form an image of the surface of the sample 119. The controller 125 may generate an XY scanning signal to two-dimensionally scan the probe 111 along the surface of the sample 119, and a Z control signal to control a distance between the probe 111 and the sample 119. The controller 125 includes a Z control section 126 to generate the Z control signal from the mixed signal. The host computer 127 may form the image of the surface of the sample 119 by use of the XY scanning signal and the Z control signal generated by the controller 125.

Figure 8:
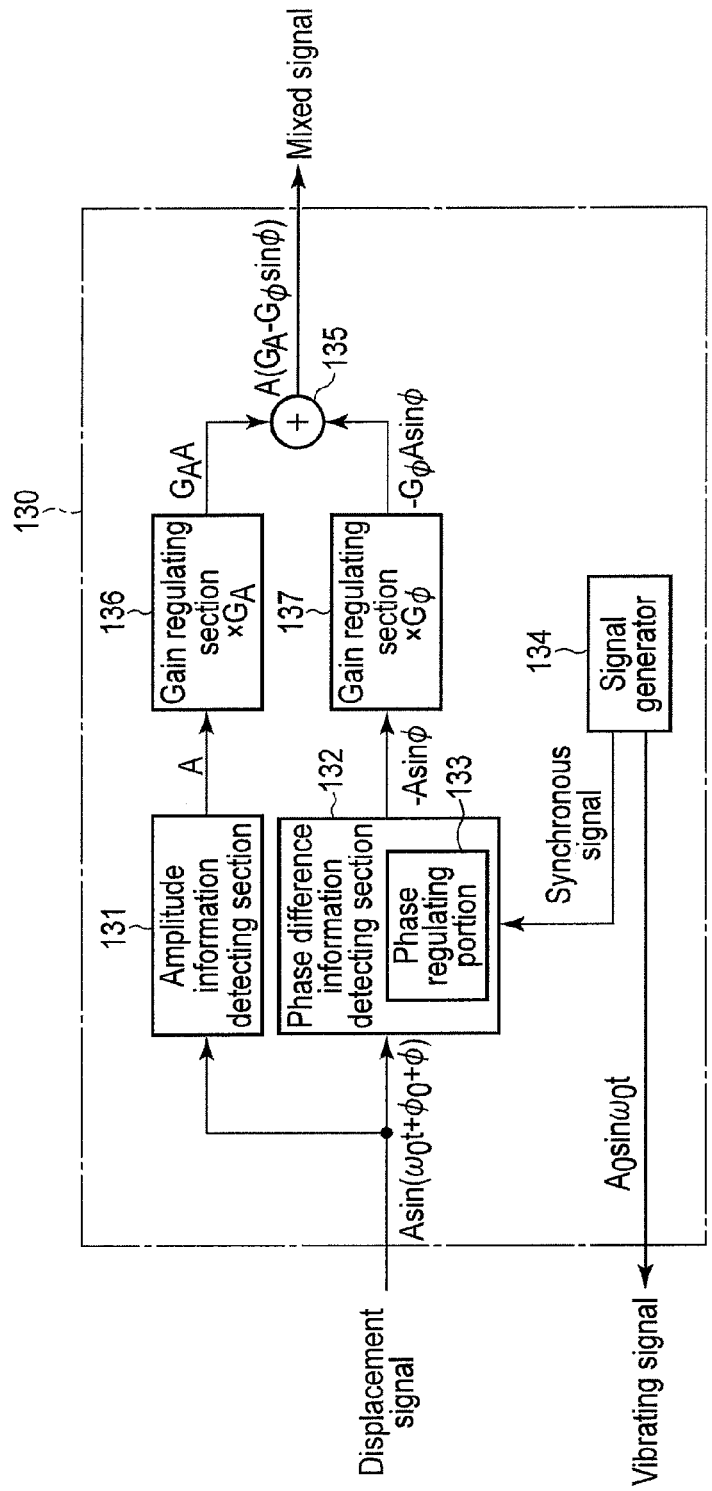
FIG. 8 shows a constitution of a mixed signal generator in the third embodiment.

A constitution of the mixed signal generator 130 is shown in FIG. 8. As shown in FIG. 8, the mixed signal generator 130 is constituted of a signal generator 134, an amplitude information detecting section 131, a phase difference information detecting section 132, an amplitude signal gain regulating section 136, a phase signal gain regulating section 137 and a calculating section 135.

The signal generator 134 generates the vibrating signal to vibrate the cantilever 112 with the predetermined amplitude at the frequency in the vicinity of the mechanical resonance frequency of the cantilever, and the generator outputs this signal to the vibrator 114. The signal generator 134 also supplies a synchronous signal synchronized with the vibrating signal to the phase difference information detecting section 132. This synchronous signal may be constituted of, for example, a square wave signal (a logic signal) of the same frequency and the same phase as in the vibrating signal.

The amplitude information detecting section 131 detects amplitude information of the displacement signal of the cantilever 112 which is output from the displacement detector 115, and generates and outputs an amplitude signal including the amplitude information of the signal.

The amplitude signal gain regulating section 136 may regulate the gain of the amplitude signal output from the amplitude information detecting section 131. The amplitude signal gain regulating section 136 amplifies, for example, the amplitude signal output from the amplitude information detecting section 131 with a gain $G_A$ to output the signal.

The phase difference information detecting section 132 detects phase difference information between the displacement signal of the cantilever 112 which is output from the displacement detector 115 and the synchronous signal supplied from the signal generator 134, and the section generates and outputs a phase signal including the phase difference information. The synchronous signal and the vibrating signal have the same frequency and the same phase, and hence a phase difference between the displacement signal and the synchronous signal is equivalent to a phase difference between the displacement signal and the vibrating signal.

The phase difference information detecting section 132 comprises a phase regulating portion 133 capable of regulating a phase of the synchronous signal to be supplied from the signal generator 134. The phase regulating portion 133 may provide a desirable phase offset to the phase of the synchronous signal supplied from the signal generator 134. Therefore, the phase regulating portion 133 may provide the desirable phase offset to the phase difference between the displacement signal and the synchronous signal. The phase difference information detecting section 132 generates and outputs the phase signal including the information of the phase difference between the synchronous signal and the displacement signal, to which the phase offset is provided. The phase difference between the synchronous signal to which the phase offset is provided and the displacement signal is equivalent to the phase difference between the displacement signal and the synchronous signal, to which the phase offset is provided.

The phase signal gain regulating section 137 may regulate the gain of the phase signal output from the phase difference information detecting section 132. The phase signal gain regulating section 137 amplifies, for example, the phase signal output from the phase difference information detecting section 132 with a gain $G_\varphi$ to output the signal.

The mixed signal generator 130 is constituted so that the gain of the amplitude signal and the gain of the phase signal may independently be regulated, respectively.

The calculating section 135 performs addition processing of the amplitude signal output from the amplitude signal gain regulating section 136 and the phase signal output from the phase signal gain regulating section 137, and outputs the processing result as the mixed signal. Here, the addition processing includes negative addition processing, i.e., so-called subtraction processing.

Here, signal processing of the mixed signal generator 130 is described in detail.

Assume that the vibrating signal is $A_0 \sin \omega_0 t$. Where, $A_0$ is an amplitude of the vibrating signal, $\omega_0$ is an angular vibration frequency of the vibrating signal, and t is time. When the resonance frequency of the cantilever 112 is $f_0$, $\omega_0$ has a value substantially equal to $2\pi \cdot f_0$.

Assume that the synchronous signal is, for example, a square wave signal of the same frequency (i.e., the angular vibration frequency $\omega_0$) and the same phase as in the vibrating signal.

Assume that the displacement signal of the cantilever 112 is $A \sin(\omega_0 t + \varphi_0 + \varphi)$. Where, A is an amplitude of the displacement signal, $\varphi_0$ is an initial phase difference of the displacement signal, which is present in a state where the probe 111 is not in contact with the sample 119, and $\varphi$ is a phase difference of the displacement signal, which is caused by the contact of the probe 111 with the sample 119. Hereinafter, for the sake of convenience, this phase difference will be called a phase shift amount. When the probe 111 is not in contact with the sample 119, $\varphi$ is 0. A and $\varphi$ are detection objects.

The phase regulating portion 133 provides a phase offset $(+\psi)$ to the phase of the synchronous signal output from the signal generator 134. That is, the phase regulating portion 133 shifts the phase of the synchronous signal as much as $(+\psi)$. This is equivalent to providing a phase offset $(-\psi)$ to the phase difference between the displacement signal of the cantilever 112 and the synchronous signal (i.e., the vibrating signal). The phase difference information detecting section 132 generates and outputs a phase signal $A \cos(\varphi_0 + \varphi - \psi)$ including information of the phase difference between the displacement signal $A \sin(\omega_0 t + \varphi_0 + \varphi)$ of the cantilever 112 and the synchronous signal to which the phase offset $(+\psi)$ is provided.

Preferably, the phase regulating portion 133 shifts the phase of the synchronous signal as much as $(\varphi_0 - \pi/2)$. That is, $\psi = \varphi_0 - \pi/2$. In this case, the phase signal output from the phase difference information detecting section 132 is $A \cos\{\varphi_0 + \varphi - (\varphi_0 - \pi/2)\} = -A \sin \varphi$.

FIG. 9 is a graph showing a relation between $-A \sin \varphi$ and $\varphi$. As seen from this graph, $-A \sin \varphi$ is most sensitive (has a high sensitivity) to a change of the phase shift amount $\varphi$ in $\varphi = 0$.

When a measurement portion is hard, the amplitude of the displacement signal of the cantilever 112 more noticeably changes than the phase thereof. This amplitude decreases as a repulsive force acting between the sample 119 and probe 111 enlarges. Conversely, when the measurement portion is soft, the phase of the displacement signal of the cantilever 112 more noticeably changes than the amplitude thereof. This phase advances (shifts in a direction of $+\varphi$) as the repulsive force acting between the sample 119 and the probe 111 enlarges. Therefore, the phase signal output from the phase difference information detecting section 132 preferably sensitively changes near $\varphi = 0$, and also preferably decreases in accordance with the change of the amplitude, as $\varphi$ advances. For such a reason, the phase offset $\varphi$ is preferably set to $\varphi = \varphi_0 - \pi/2$ so that the phase signal $A \cos(\varphi_0 + \varphi - \varphi)$ turns to $-A \sin \varphi$.

As seen again with reference to FIG. 8, the amplitude information detecting section 131 detects the amplitude A of the displacement signal $A \sin(\omega_0 t + \varphi_0 + \varphi)$ of the cantilever 112, and outputs an amplitude signal A indicating the amplitude.

The amplitude signal gain regulating section 136 amplifies, with the gain $G_A$, the amplitude signal A output from the amplitude information detecting section 131, and outputs $G_A A$ as the amplitude signal.

Furthermore, the phase signal gain regulating section 137 amplifies, with the gain $G_\varphi$, a phase signal $(-A \sin \varphi)$ output from the phase difference information detecting section 132, and outputs $-G_\varphi A \sin \varphi$ as the phase signal.

The calculating section 135 performs the addition processing of the amplitude signal $G_A A$ and the phase signal $(-G_\varphi A \sin \varphi)$, and outputs $A(G_A - G_\varphi \sin \varphi)$ as the mixed signal.

The gain $G_A$ by the amplitude signal gain regulating section 136 and the gain $G_\varphi$ by the phase signal gain regulating section 137 regulate a mixture ratio of the amplitude signal A and the phase signal $(-A \sin \varphi)$, and may be changed in accordance with hardness (softness) of the measurement portion. A basic state of each of the gain $G_A$ and the gain $G_\varphi$ is 1, i.e., the mixture ratio is 1:1. When the hard portion is dominant as the measurement portion of the sample in which the hard portion and the soft portion are mixed, a ratio of the amplitude signal A is large. For example, the mixture ratio of the amplitude signal A and the phase signal $(-A \sin \varphi)$ is 3:1. For example, the gain $G_A$ and the gain $G_\varphi$ are 1.5 and 0.5, respectively. Furthermore, when the soft portion is dominant as the measurement portion of the sample in which the hard portion and the soft portion are mixed, a ratio of the phase signal $(-A \sin \varphi)$ is large. For example, the mixture ratio of the amplitude signal A and the phase signal $(-A \sin \varphi)$ is 1:3. For example, the gain $G_A$ and the gain $G_\varphi$ are 0.5 and 1.5, respectively. Each of the gain $G_A$ and the gain $G_\varphi$ preferably can be regulated in a range of 0 to 2.

As shown in FIG. 7, the mixed signal output from the calculating section 135 is supplied to the Z control section 126 in the controller 125 via the mixed signal gain regulating section 128. The Z control section 126 generates the Z control signal to control the distance between the sample 119 and the probe 111 so that the mixed signal is kept to be constant, and the section supplies this signal to the Z driver 123. The Z driver 123 controls the Z scanner 121 in accordance with the Z control signal to be supplied. As a result, the distance between the sample 119 and the probe 111 is controlled so that the mixed signal is kept to be constant.

The controller 125 generates the XY scanning signal to two-dimensionally scan the probe 111 along the surface of the sample 119, and supplies this signal to the XY driver 124. The XY driver 124 controls the XY scanner 122 in accordance with the XY scanning signal to be supplied. As a result, the probe 111 is two-dimensionally scanned along the surface of the sample 119.

The controller 125 also supplies the XY scanning signal and the Z control signal to the host computer 127. The host computer 127 forms the image of the surface of the sample 119 by use of the XY scanning signal and the Z control signal, and displays the image, or stores data of the image.

In the scanning probe microscope of the present embodiment, the repulsive force working between the sample 119 and the probe 111 is detected as the mixed signal $(G_A A - G_\varphi A \sin \varphi)$, and on the basis of the signal, the distance between the sample 119 and the probe 111 is controlled. When the measurement portion is hard, the amplitude signal A noticeably changes. That is, when the measurement portion is hard, the amplitude signal $G_A A$ noticeably changes. Furthermore, when the measurement portion is soft, the phase signal $(-A \sin \varphi)$ noticeably changes. That is, when the measurement portion is soft, the phase signal $(-G_\varphi A \sin \varphi)$ noticeably changes. Therefore, even when the hard portion and the soft portion are mixed in the sample 119, the repulsive force working between the sample 119 and the probe 111 to both of the portions can sensitively be detected. Furthermore, the mixture ratio of the amplitude signal A and the phase signal $(-A \sin \varphi)$ can be regulated. The mixture ratio of the amplitude signal A and the phase signal $(-A \sin \varphi)$ is regulated in accordance with the hardness (the softness) of the measurement portion, so that in the sample in which the hard portion and the soft portion are mixed, an optimum detection state can be obtained even in any manner where the portions are mixed. As a result, even a surface shape of the sample in which the hard portion and the soft portion are mixed can accurately and stably be determined.

[Modification of Third Embodiment]

Figure 10:
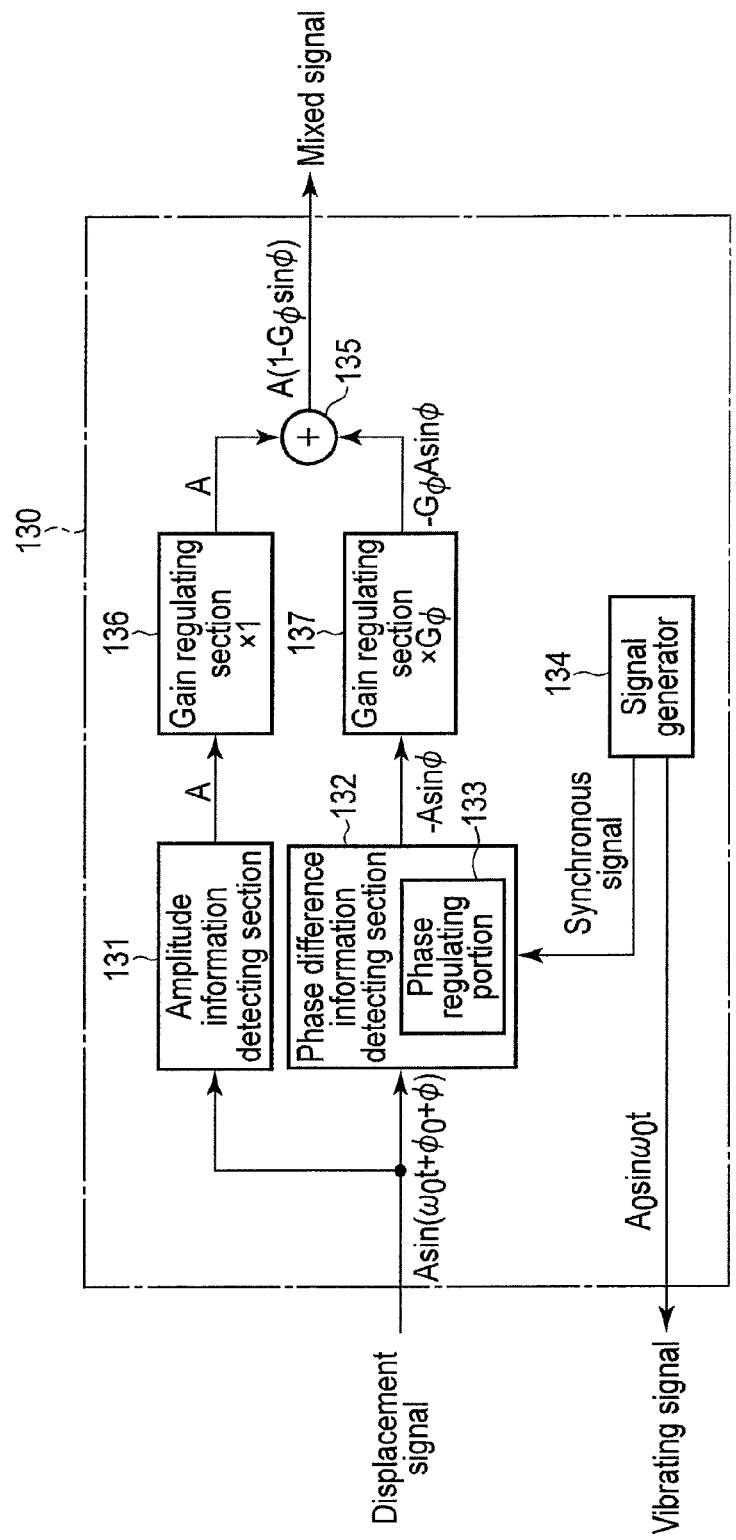
FIG. 10 shows a modification of the mixed signal generator in the third embodiment.

As a modification of the third embodiment, a particular use configuration of the mixed signal generator 130 will be described. The mixed signal generator by this modification is shown in FIG. 10. The mixed signal generator 130 of FIG. 10 is different from the mixed signal generator 130 of FIG. 8 only in that a gain of an amplitude signal gain regulating section 136 is fixed to 1.

In this modification, the amplitude signal gain regulating section 136 does not amplify an amplitude signal A output from an amplitude information detecting section 131. In other words, the amplitude signal gain regulating section amplifies the signal with the gain of 1, and outputs A as the amplitude signal. A phase signal gain regulating section 137 amplifies, with a gain $G_\varphi$, a phase signal $(-A \sin \varphi)$ output from a phase difference information detecting section 132, and outputs $-G_\varphi A \sin \varphi$ as a phase signal. A calculating section 135 performs addition processing of the amplitude signal A and the phase signal $(-G_\varphi A \sin \varphi)$, and outputs $A(1 - G_\varphi \sin \varphi)$ as a mixed signal.

In this modification, the gain of the amplitude signal gain regulating section 136 is fixed to 1, and the mixed signal generator 130 may only regulate the gain of the phase signal by the phase signal gain regulating section 137. The regulation of a mixture ratio of the amplitude signal and the phase signal is performed by changing the gain of the phase signal by the phase signal gain regulating section 137. Therefore, there is an advantage that the regulation of the mixture ratio of the amplitude signal and the phase signal is easily performed.

However, on the other hand, when a measurement portion is soft and the gain of the phase signal gain regulating section 137 is excessively large, a gain (a control loop gain) of a feedback loop of control to keep the mixed signal to be constant enlarges, which incurs a possibility of adversely affecting stability of the control. In such a case, the gain of the feedback loop is regulated (corrected) by a mixed signal gain regulating section 128, for example, the gain is preferably set to be small.

Fixing the gain of the amplitude signal gain regulating section 136 to 1 is equivalent to the fact that the amplitude signal gain regulating section 136 does not amplify the amplitude signal but passes the signal, in a circuit manner. Therefore, the mixed signal generator 130 may have a constitution in which the amplitude signal gain regulating section 136 is omitted, instead of fixing the gain of the amplitude signal gain regulating section 136 to 1.

Here, there has been described the modification in which the gain of the amplitude signal gain regulating section 136 is fixed to 1, but a modification is possible in which the gain of the phase signal gain regulating section 137 is fixed to 1 instead of fixing the gain of the amplitude signal gain regulating section 136 to 1. Furthermore, another modification is possible in which the phase signal gain regulating section 137 is omitted. In this modification, the regulation of the mixture ratio of the amplitude signal and the phase signal is performed by changing the gain of the amplitude signal gain regulating section 136. This modification also has an advantage that the regulation of the mixture ratio of the amplitude signal and the phase signal is easily performed.

When the present embodiment and the modifications of the embodiment are considered together, the mixed signal generator 130 may only have a constitution in which at least one of the gain of the amplitude signal and the gain of the phase signal may be regulated.

<Fourth Embodiment>

A scanning probe microscope of the present embodiment is the same as the scanning probe microscope of the third embodiment except that a constitution of a mixed signal generator is different. Consequently, here, description is made while importance is placed on a constitution and a function of the mixed signal generator of the present embodiment.

Figure 11:
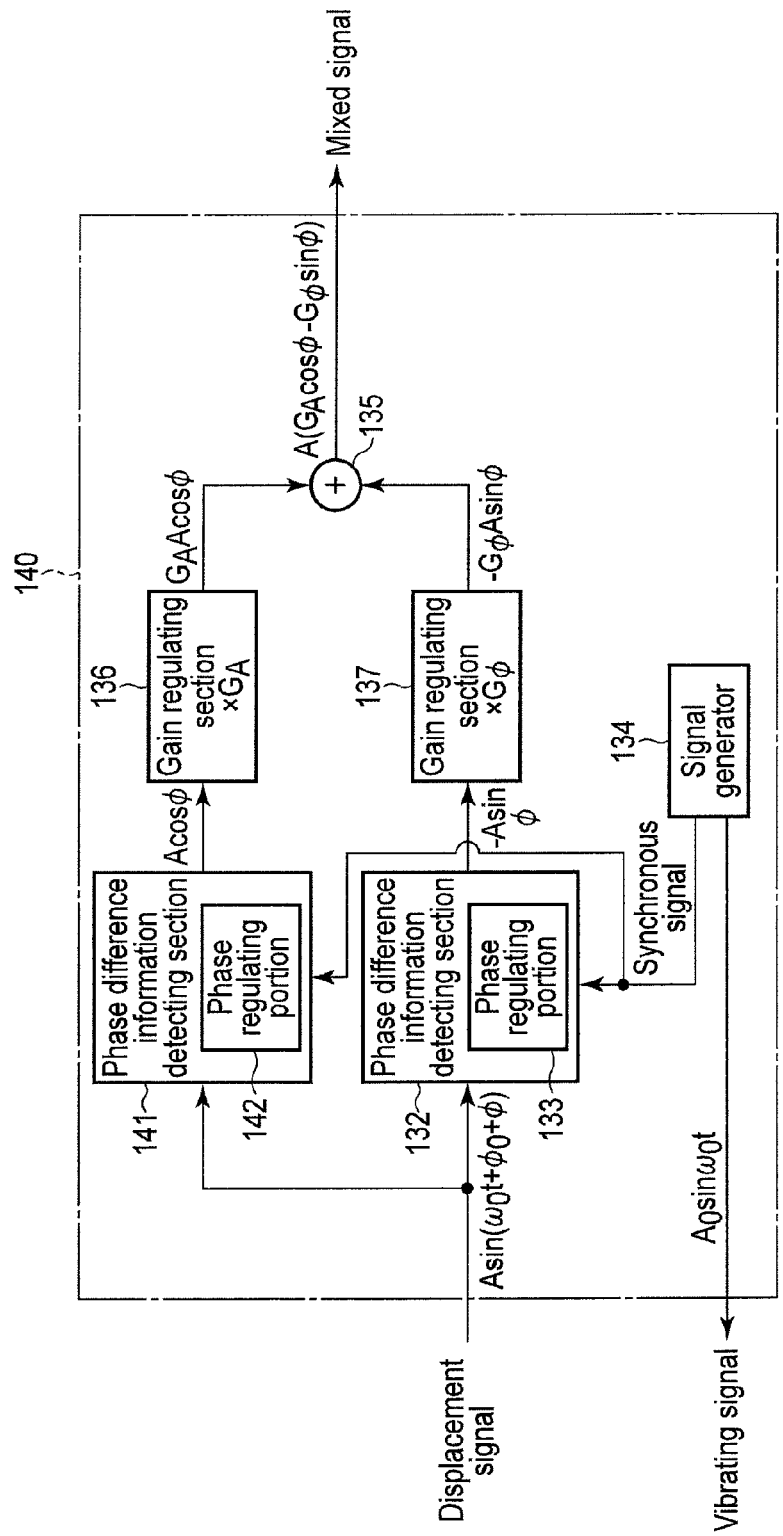
FIG. 11 shows a constitution of a mixed signal generator in a fourth embodiment.

FIG. 11 shows the constitution of a mixed signal generator 140 of the present embodiment. As shown in FIG. 11, the mixed signal generator 140 is constituted of a signal generator 134, a phase difference information detecting section 141, a phase difference information detecting section 132, an amplitude signal gain regulating section 136, a phase signal gain regulating section 137, and a calculating section 135.

Details of the signal generator 134, the phase difference information detecting section 132, the amplitude signal gain regulating section 136, the phase signal gain regulating section 137 and the calculating section 135 have been described in the third embodiment.

As seen from comparison between FIG. 8 and FIG. 11, the mixed signal generator 140 is different from the mixed signal generator 130 of the third embodiment in that the mixed signal generator comprises the phase difference information detecting section 141 in place of the amplitude information detecting section 131. In other words, in the mixed signal generator 140, the amplitude information detecting section 131 of the mixed signal generator 130 of the third embodiment is replaced with the phase difference information detecting section 141.

The signal generator 134 generates a vibrating signal to vibrate a cantilever 112 with a predetermined amplitude at a frequency in the vicinity of a mechanical resonance frequency of the cantilever, to output this signal to a vibrator 114. The signal generator 134 also outputs a synchronous signal synchronized with the vibrating signal to the phase difference information detecting section 141 and the phase difference information detecting section 132. This synchronous signal may be constituted of, for example, a square wave signal (a logic signal) of the same frequency and the same phase as in the vibrating signal.

The phase difference information detecting section 141 generates and outputs a phase signal including information of a phase difference between a displacement signal of the cantilever 112 supplied from a displacement detector 115 and the synchronous signal supplied from the signal generator 134.

The phase difference information detecting section 141 comprises a phase regulating portion 142 capable of regulating a phase of the synchronous signal supplied from the signal generator 134. The phase regulating portion 142 may provide a desirable phase offset to the phase of the synchronous signal supplied from the signal generator 134. Therefore, the phase regulating portion 142 may provide the desirable phase offset to the phase difference between the displacement signal and the synchronous signal. The phase difference information detecting section 141 outputs the phase signal including the information of the phase difference between the synchronous signal to which the phase offset is provided and the displacement signal.

The phase difference information detecting section 132 generates and outputs a phase signal including information of the phase difference between the displacement signal of the cantilever 112 supplied from the displacement detector 115 and the synchronous signal supplied from the signal generator 134.

The phase difference information detecting section 132 comprises a phase regulating portion 133 capable of regulating the phase of the synchronous signal supplied from the signal generator 134. The phase regulating portion 133 may provide a desirable phase offset to the phase of the synchronous signal supplied from the signal generator 134. Therefore, the phase regulating portion 133 may provide the desirable phase offset to the phase difference between the displacement signal and the synchronous signal. The phase difference information detecting section 132 outputs the phase signal including the information of the phase difference between the synchronous signal to which the phase offset is provided and the displacement signal.

Here, the synchronous signal and the vibrating signal have the same frequency and phase, and hence the phase difference between the displacement signal and the synchronous signal is equivalent to a phase difference between the displacement signal and the vibrating signal. Furthermore, the phase difference between the synchronous signal to which the phase offset is provided and the displacement signal is equivalent to the phase difference between the displacement signal and the synchronous signal, to which the phase offset is provided.

The amplitude signal gain regulating section 136 amplifies the phase signal output from the phase difference information detecting section 141 with an amplification ratio $G_A$, to output the result as a first phase signal.

The phase signal gain regulating section 137 amplifies the phase signal output from the phase difference information detecting section 132 with an amplification ratio $G_\varphi$, to output the result as a second phase signal.

The calculating section 135 performs addition processing of the first phase signal supplied from the amplitude signal gain regulating section 136 and the second phase signal supplied from the phase signal gain regulating section 137, to output the processing result as a mixed signal.

Here, signal processing of the mixed signal generator 140 is described in detail.

Assume that the vibrating signal is $A_0 \sin \omega_0 t$. Where, $A_0$ is an amplitude of the vibrating signal, $\omega_0$ is an angular vibration frequency of the vibrating signal, and t is time. When the resonance frequency of the cantilever 112 is $f_0$, $\omega_0$ has a value substantially equal to $2\pi \cdot f_0$.

Assume that the synchronous signal is, for example, the square wave signal of the same frequency (i.e., the angular vibration frequency $\omega_0$) and the same phase as in the vibrating signal.

Assume that the displacement signal of the cantilever 112 is $A \sin(\omega_0 t + \varphi_0 + \varphi)$. Where, A is an amplitude of the displacement signal, $\varphi_0$ is an initial value of a phase of the displacement signal in a state where a probe 111 is not in contact with a sample 119, and $\varphi$ is a phase shift amount of the displacement signal that is caused by the contact of the probe 111 with the sample 119. When the probe 111 is not in contact with the sample 119, $\varphi$ is 0. A and $\varphi$ are detection objects.

The phase regulating portion 142 provides a phase offset $(+\psi_1)$ to the phase of the synchronous signal output from the signal generator 134. That is, the phase regulating portion 142 shifts the phase of the synchronous signal as much as $(+\psi_1)$. The phase difference information detecting section 132 generates and outputs a phase signal $A \cos(\varphi_0 + \varphi - \psi_1)$ including information of the phase difference between the displacement signal $A \sin(\omega_0 t+\varphi_0+\varphi)$ of the cantilever 112 and the synchronous signal to which the phase offset $(+\psi_1)$ is provided.

Preferably, the phase regulating portion 142 shifts the phase of the synchronous signal as much as $(+\varphi_0)$. That is, $\psi_1=\varphi_0$. In this case, the phase signal output from the phase difference information detecting section 141 is $A \cos(\varphi_0+\varphi-\varphi_0)=A \cos \varphi$.

The phase regulating portion 133 provides a phase offset $(+\psi_2)$ to the phase of the synchronous signal output from the signal generator 134. That is, the phase regulating portion 133 shifts the phase of the synchronous signal as much as $(+\psi_1)$. The phase difference information detecting section 132 generates and outputs a phase signal $A \cos(\varphi_0+\varphi-\psi_2)$ including information of the phase difference between the displacement signal $A \sin(\omega_0 t+\varphi_0+\varphi)$ of the cantilever 112 and the synchronous signal to which the phase offset $(+\psi_2)$ is provided.

Preferably, the phase regulating portion 133 shifts the phase of the synchronous signal as much as $(\varphi_0-\pi/2)$. That is, $\psi_2=\varphi_0-\pi/2$. In this case, the phase signal output from the phase difference information detecting section 132 is $A \cos\{\varphi_0+\varphi-(\varphi_0-\pi/2)\}=-A \sin \varphi$.

FIG. 12 is a graph showing a relation between $A \cos \varphi$ and $\varphi$. As seen from this graph, $A \cos \varphi$ is most insensitive (has a low sensitivity) to a change of the phase shift amount $\varphi$ in $\varphi=0$.

FIG. 13 is a graph showing a relation between $-A \sin \varphi$ and $\varphi$. As seen from this graph, $-A \sin \varphi$ is most sensitive (has a high sensitivity) to the change of the phase shift amount $\varphi$ in $\varphi=0$, and decreases as the phase advances from 0. That is, the phase signal $(-A \sin \varphi)$ decreases as a repulsive force working between the sample 119 and the probe 111 enlarges, in the same manner as in the direction of the change of the amplitude signal.

The amplitude signal gain regulating section 136 amplifies the phase signal $A \cos \varphi$ output from the phase difference information detecting section 141 with a gain $G_A$, and outputs $G_A A \cos \varphi$ as the first phase signal.

The phase signal gain regulating section 137 amplifies the phase signal $(-A \sin \varphi)$ output from the phase difference information detecting section 132 with a gain $G_\varphi$, and outputs $-G_\varphi A \sin \varphi$ as the second phase signal.

The calculating section 135 performs the addition processing of the first phase signal $G_A A \cos \varphi$ and the second phase signal $(-G_\varphi A \sin \varphi)$, and outputs $A(G_A \cos \varphi - G_\varphi \sin \varphi)$ as the mixed signal.

The gain $G_A$ by the amplitude signal gain regulating section 136 and the gain $G_\varphi$ by the phase signal gain regulating section 137 regulate a mixture ratio of the first phase signal $A \cos \varphi$ and the second phase signal $(-A \sin \varphi)$, respectively, and the gains may be changed in accordance with a hardness (softness) of a measurement portion. A basic state of each of the gain $G_A$ and the gain $G_\varphi$ is 1, i.e., the mixture ratio is 1:1.

In this case, when the measurement object is hard, i.e., when a change of the amplitude is larger than the phase shift amount $\varphi$, in the change amount of the signal, $A \cos \varphi > -A \sin \varphi$, and the signal of $A \cos \varphi$ dominantly works. Furthermore, when the change of $\varphi$ is small, $\cos \varphi$ nearly equals 1, so that it can be considered that $A \cos \varphi$ nearly equals $A$, i.e., the phase signal $A \cos \varphi$ is about the same as the amplitude signal $A$.

Furthermore, when the measurement object is soft, i.e., when the phase shift amount $\varphi$ is larger than the change of the amplitude, in the change amount of the signal, $-A \sin \varphi > A \cos \varphi$, and the signal of $-A \sin \varphi$ dominantly works. At this time, the change of $\varphi$ is large, and hence the change of $A \cos \varphi$ is also larger than that in the third embodiment (the case of the only $A$).

Furthermore, when a hard portion is dominant as the measurement portion of the sample in which the hard portion and a soft portion are mixed, a ratio of the first phase signal $A \cos \varphi$ is large. For example, the mixture ratio of the first phase signal $A \cos \varphi$ and the second phase signal $(-A \sin \varphi)$ is 3:1. That is, the gain $G_A$ and the gain $G_\varphi$ are 1.5 and 0.5, respectively. Furthermore, when the soft portion is dominant as the measurement portion of the sample in which the hard portion and the soft portion are mixed, a ratio of the second phase signal $(-A \sin \varphi)$ is large. For example, the mixture ratio of the first phase signal $A \cos \varphi$ and the second phase signal $(-A \sin \varphi)$ is 1:3. That is, the gain $G_A$ and the gain $G_\varphi$ are 0.5 and 1.5, respectively. The gain $G_A$ and the gain $G_\varphi$ preferably can be regulated in a range of 0 to 2, respectively.

The mixed signal output from the calculating section 135 is supplied to a Z control section 126 in a controller 125 via a gain regulating section 128 as shown in FIG. 7. The Z control section 126 generates a Z control signal to control a distance between the sample 119 and probe 111 so that the mixed signal is kept to be constant, to supply this signal to a Z driver 123. The Z driver 123 controls a Z scanner 121 in accordance with the Z control signal to be supplied. As a result, the distance between the sample 119 and the probe 111 is controlled to keep the mixed signal to be constant.

The controller 125 generates an XY scanning signal to two-dimensionally scan the probe 111 along the surface of the sample 119, and supplies this signal to an XY driver 124. The XY driver 124 controls an XY scanner 122 in accordance with the XY scanning signal to be supplied. As a result, the probe 111 is two-dimensionally scanned along the surface of the sample 119.

The controller 125 also supplies the XY scanning signal and the Z control signal to a host computer 127. The host computer 127 forms an image of the surface of the sample 119 by use of the XY scanning signal and the Z control signal, and displays the image, or stores data of the image.

In the scanning probe microscope of the present embodiment, the repulsive force working between the sample 119 and the probe 111 is detected as the mixed signal $A(G_A \cos \varphi - G_\varphi \sin \varphi)$, and on the basis of the signal, the distance between the sample 119 and the probe 111 is controlled. When the measurement portion is hard, it can be considered that $A \cos \varphi$ is substantially $A$, and hence the first phase signal $G_A A \cos \varphi$ noticeably changes. As a result, as to the hard portion, the repulsive force working between the sample 119 and the probe 111 can be detected with a sensitivity of the same degree as in the third embodiment. Furthermore, when the measurement portion is soft, the second phase signal $(-G_\varphi A \sin \varphi)$ noticeably changes, and the first phase signal $G_A A \cos \varphi$ also changes. As a result, as to the soft portion, the repulsive force working between the sample 119 and the probe 111 can be detected with a sensitivity higher than that of the third embodiment. Furthermore, the mixture ratio of the first phase signal $A \cos \varphi$ and the second phase signal $(-A \sin \varphi)$ can be regulated in accordance with the hardness (softness) of the measurement portion. Consequently, in the sample in which the hard portion and the soft portion are mixed, an optimum detection state can be obtained even in any manner where the portions are mixed. As a result, even a surface shape of the sample in which the hard portion and the soft portion are mixed can accurately and stably be determined.

Also the scanning probe microscope of the present embodiment may be modified similarly to the modification of the third embodiment shown in FIG. 10.

<Fifth Embodiment>

FIG. 14 shows a constitution of a scanning probe microscope of the present embodiment. In FIG. 14, members denoted with the same reference numerals as in the members of the scanning probe microscope of the third embodiment shown in FIG. 7 are similar members, and detailed description thereof is omitted. The scanning probe microscope of the present embodiment is different from the scanning probe microscope of the third embodiment shown in FIG. 7 in that the scanning probe microscope comprises a mixed signal generator 150 in place of the mixed signal generator 130, and further comprises an amplitude display section (display) 151 and a phase display section (display) 152.

FIG. 15 shows a constitution of the mixed signal generator 150 of the present embodiment. In FIG. 15, members denoted with the same reference numerals as in the members of the mixed signal generator 130 shown in FIG. 8 are similar members, and detailed description thereof is omitted. As shown in FIG. 15, the mixed signal generator 150 is constituted to output an amplitude signal A output from an amplitude information detecting section 131 and a phase signal (−A sin φ) output from a phase difference information detecting section 132 to the outside of the mixed signal generator 150, respectively.

The amplitude signal A and the phase signal (−A sin φ) output from the mixed signal generator 150 are supplied to the amplitude display section 151 and the phase display section 152, respectively. The amplitude display section 151 has a function of displaying information including information of an amplitude of the displacement signal and further, the phase display section 152 has a function of displaying information including information of a phase difference of the displacement signal. That is, in the scanning probe microscope of the present embodiment, the amplitude signal A and the phase signal (−A sin φ) can be monitored. As a result, a state of a hardness (softness) of a measurement portion of a sample is easily judged, and regulation of a mixture ratio of the amplitude signal A and the phase signal (−A sin φ) can easily be performed.

The amplitude display section 151 and the phase display section 152 may be numeric value meters, but are preferably image monitors capable of displaying images. Furthermore, instead of disposing the amplitude display section 151 and the phase display section 152 separately as shown in FIG. 14, a constitution may be disposed in which the amplitude signal A and the phase signal (−A sin φ) are taken into a controller 160 and an image is displayed in a host computer 161 as shown in FIG. 16.

Figure 17:
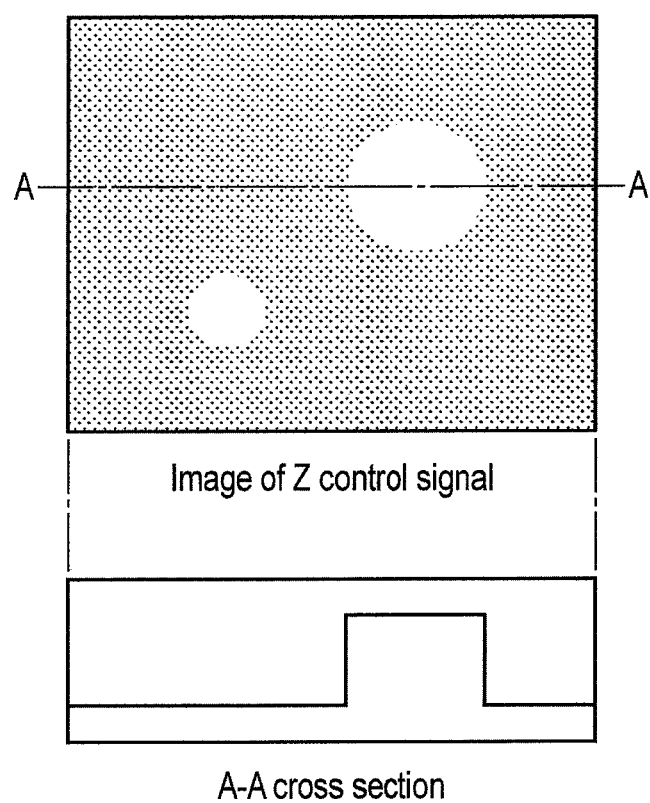
FIG. 17 shows an information display example (an image of a z control signal) in the scanning probe microscope of the fifth embodiment.
Figure 19:
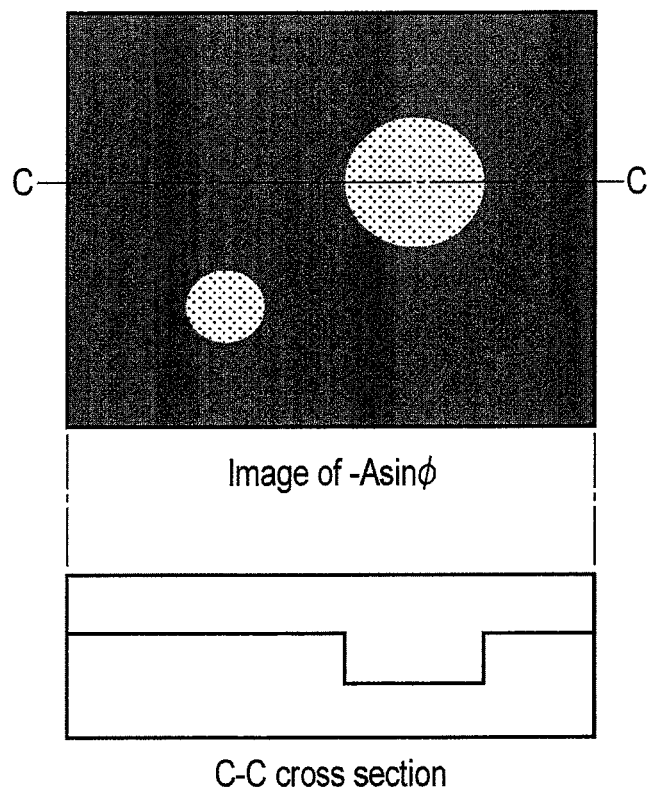
FIG. 19 shows an information display example (an image of −A sin φ) in the scanning probe microscope of the fifth embodiment.

FIG. 17, FIG. 18 and FIG. 19 show examples of display of images of a Z control signal, the amplitude signal A and the phase signal (−A sin φ), respectively. FIG. 17 shows an image showing a surface shape of a sample 119 which is obtained by the scanning probe microscope of the present embodiment. A region of dark gray has a low height, and a white region has a projecting shape. In the following description, the white region will be called a convex portion. FIG. 18 shows a plot image of the amplitude signal A which is obtained simultaneously with the acquisition of the image of FIG. 17. Furthermore, FIG. 19 is a plot image of the phase signal (−A sin φ) which is obtained simultaneously with the acquisition of the image of FIG. 17.

In the plot image of the amplitude signal A of FIG. 18, the convex portions of the sample are displayed as high portions. This represents a phenomenon that a signal level of the amplitude signal A is large in the convex portion. On the other hand, in the plot image of the phase signal (−A sin φ) of FIG. 19, the convex portions of the sample are displayed as low portions. This represents a phenomenon that a signal level of the phase signal (−A sin φ) is small in the convex portion.

Each of the amplitude signal A and the phase signal (−A sin φ) decreases as a repulsive force acting between the sample 119 and a probe 111 enlarges. When the sample 119 is hard, a sensitivity of the amplitude signal A is higher than that of the phase signal (−A sin φ). That is, a decrease ratio of the amplitude signal A is larger than that of the phase signal (−A sin φ). Furthermore, when the sample 119 is soft, the sensitivity of the phase signal (−A sin φ) is higher than that of the amplitude signal A. That is, the decrease ratio of the phase signal (−A sin φ) is larger than that of the amplitude signal A. From this fact, it is seen that the sample is hard in a region where the signal level of the amplitude signal A decreases and that the sample is soft in a region where the signal level of the phase signal (−A sin φ) decreases. Therefore, in the image of the surface shape of the sample 119 of FIG. 17, it can be judged that the convex portion is soft as compared with the region of dark gray.

As described above, the amplitude signal A and the phase signal (−A sin φ) are displayed and monitored, whereby the state of the hardness (softness) of the measurement portion of the sample is easily judged. As a result, the regulation of the mixture ratio of the amplitude signal A and the phase signal (−A sin φ) may easily be performed.

In the scanning probe microscope of the present embodiment, control is executed so that a mixed signal obtained by addition processing of the amplitude signal and the phase signal is kept to be constant. Therefore, when one of the amplitude signal A and the phase signal (−A sin φ) decreases, the other signal increases. Consequently, a similar effect can be obtained simply by displaying one of the amplitude signal A and the phase signal (−A sin φ).

<Sixth Embodiment>

FIG. 20 shows a constitution of a scanning probe microscope of the present embodiment. In FIG. 20, members denoted with the same reference numerals as in the members of the scanning probe microscope of the third embodiment shown in FIG. 7 are similar members, and detailed description thereof is omitted. The scanning probe microscope of the present embodiment is different from the scanning probe microscope of the third embodiment in that the scanning probe microscope comprises a mixed signal generator 170 in place of the mixed signal generator 130.

[Constitution Example 1 of Mixed Signal Generator 170]

FIG. 21 shows one constitution example of the mixed signal generator 170 of the present embodiment. In FIG. 21, members denoted with the same reference numerals as in the members of the mixed signal generator 130 shown in FIG. 8 are similar members, and detailed description thereof is omitted.

As shown in FIG. 21, the mixed signal generator 170 comprises an amplitude information detecting section (amplitude information detector) 131, a phase difference information detecting section 132, a signal generator 134, plural, for example, three amplitude signal amplifying sections (amplifiers) 171A, 172A, and 173A, plural, for example, three phase signal amplifying sections (amplifiers) 171B, 172B, and 173B, a selecting section (selector) 174 and a calculating section (calculator) 135.

Details of the amplitude information detecting section 131, the phase difference information detecting section 132, the signal generator 134 and the calculating section 135 are as described in the third embodiment.

The amplitude signal amplifying sections 171A, 172A, and 173A amplify an amplitude signal output from the amplitude information detecting section 131 with gains $G_{A1}$, $G_{A2}$, and $G_{A3}$, respectively, to output signals. The gains $G_{A1}$, $G_{A2}$, and $G_{A3}$ are preset fixed values different from each other.

The phase signal amplifying sections 171B, 172B, and 173B amplify a phase signal output from the phase difference information detecting section 132 with gains $G_{\varphi1}$, $G_{\varphi2}$, and $G_{\varphi3}$, respectively, to output signals. The gains $G_{\varphi1}$, $G_{\varphi2}$, and $G_{\varphi3}$ are preset fixed values different from each other.

The three amplitude signal amplifying sections 171A, 172A, and 173A and the three phase signal amplifying sections 171B, 172B, and 173B constitute three pairs, respectively.

The selecting section 174 is constituted to select one of the amplitude signal amplifying sections 171A, 172A, and 173A and one of the phase signal amplifying sections 171B, 172B, and 173B to constitute the pair, in accordance with a selection signal input from a controller 125. As a result, the selecting section 174 outputs, at a time, one pair of the amplitude signal amplified by the amplitude signal amplifying section 171A and the phase signal amplified by the phase signal amplifying section 171B, the amplitude signal amplified by the amplitude signal amplifying section 172A and the phase signal amplified by the phase signal amplifying section 172B, and the amplitude signal amplified by the amplitude signal amplifying section 173A and the phase signal amplified by the phase signal amplifying section 173B.

The calculating section 135 performs addition processing of the amplitude signal and the phase signal output from the selecting section 174, and outputs the processing result as a mixed signal. In other words, the calculating section 135 performs the addition processing of the amplitude signal output from one of the amplitude signal amplifying sections 171A, 172A, and 173A that is selected by the selecting section 174, and the phase signal output from one of the phase signal amplifying sections 171B, 172B, and 173B that is selected by the selecting section 174.

The mixed signal generator 170 outputs the signal output from the calculating section 135 as the mixed signal.

[Constitution Example 2 of Mixed Signal Generator 170]

Figure 22:
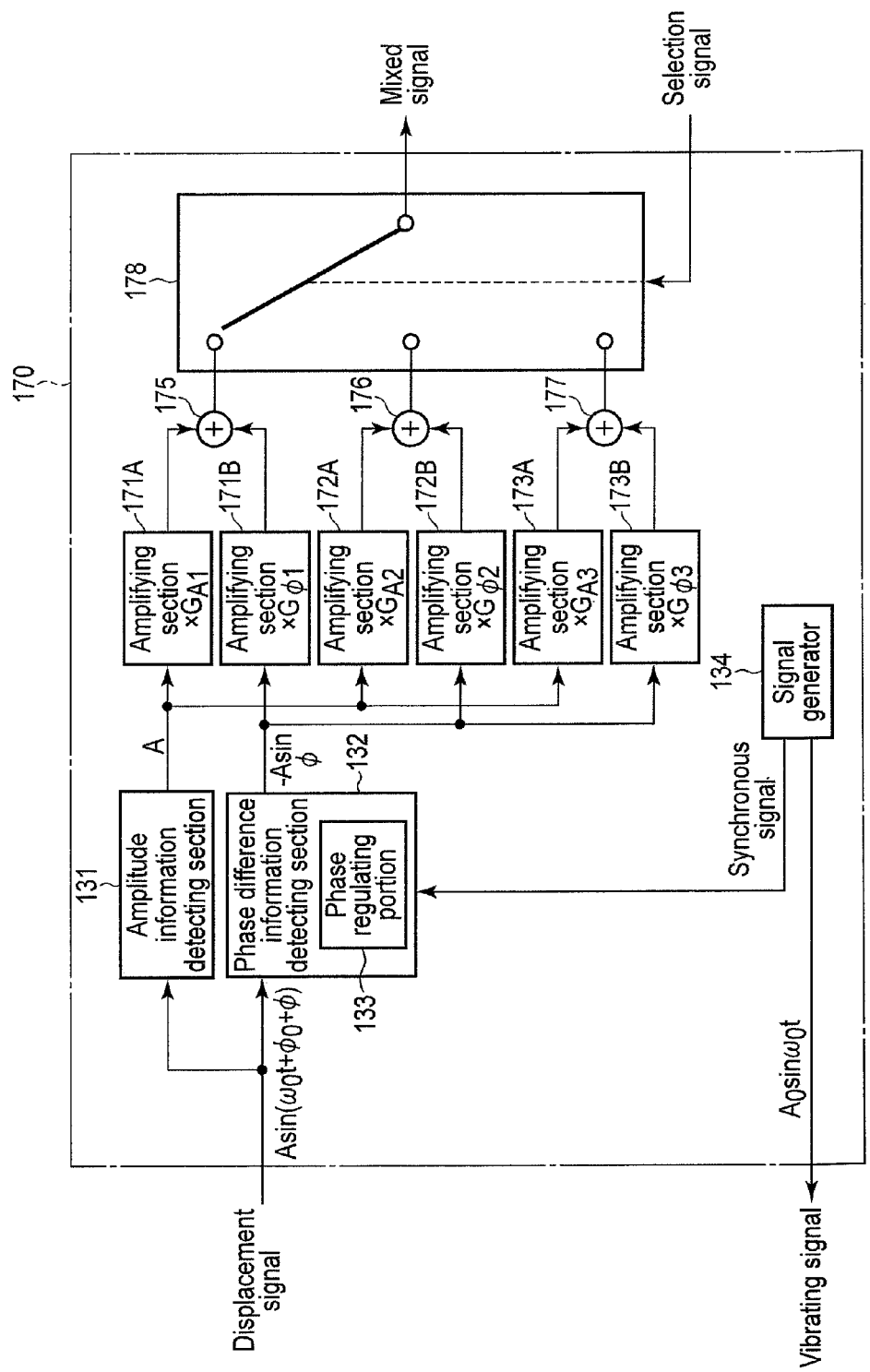
FIG. 22 shows another constitution example of the mixed signal generator in the sixth embodiment.

FIG. 22 shows another constitution example of the mixed signal generator 170 of the present embodiment. In FIG. 22, members denoted with the same reference numerals as in the members of the mixed signal generator 130 shown in FIG. 8 are similar members, and detailed description thereof is omitted.

As shown in FIG. 22, the mixed signal generator 170 comprises an amplitude information detecting section 131, a phase difference information detecting section 132, a signal generator 134, plural, for example, three amplitude signal amplifying sections 171A, 172A, and 173A, plural, for example, three phase signal amplifying sections 171B, 172B, and 173B, plural, for example, three calculating sections 175, 176, and 177, and a selecting section 178.

Details of the amplitude information detecting section 131, the phase difference information detecting section 132 and the signal generator 134 are as described in the third embodiment.

The amplitude signal amplifying sections 171A, 172A, and 173A amplify an amplitude signal output from the amplitude information detecting section 131 with gains $G_{A1}$, $G_{A2}$, and $G_{A3}$, respectively, to output signals. The gains $G_{A1}$, $G_{A2}$, and $G_{A3}$ are preset fixed values different from each other.

The phase signal amplifying sections 171B, 172B, and 173B amplify a phase signal output from the phase difference information detecting section 132 with gains $G_{\varphi1}$, $G_{\varphi2}$, and $G_{\varphi3}$, respectively, to output signals. The gains $G_{\varphi1}$, $G_{\varphi2}$, and $G_{\varphi3}$ are preset fixed values different from each other.

Furthermore, as to ratios $G_{A1}/G_{\varphi1}$, $G_{A2}/G_{\varphi2}$, and $G_{A3}/G_{\varphi3}$ between the gains $G_{A1}$, $G_{A2}$, and $G_{A3}$ and the gains $G_{\varphi1}$, $G_{\varphi2}$, and $G_{\varphi3}$, one ratio is set to be smaller than 1, and the other ratio is set to be larger than 1.

The three amplitude signal amplifying sections 171A, 172A, and 173A and the three phase signal amplifying sections 171B, 172B, and 173B constitute three pairs, respectively.

The calculating section 175 performs addition processing of the amplitude signal amplified by the amplitude signal amplifying section 171A and the phase signal amplified by the phase signal amplifying section 171B to output the signal. The calculating section 176 performs the addition processing of the amplitude signal amplified by the amplitude signal amplifying section 172A and the phase signal amplified by the phase signal amplifying section 172B to output the signal. The calculating section 177 performs the addition processing of the amplitude signal amplified by the amplitude signal amplifying section 173A and the phase signal amplified by the phase signal amplifying section 173B to output the signal.

The selecting section 178 selects and outputs one of the signals output from the calculating sections 175, 176, and 177, respectively, in accordance with a selection signal input from a controller 125.

The mixed signal generator 170 outputs the signal output from the selecting section 178 as a mixed signal.

In each of the constitution example of FIG. 21 and the constitution example of FIG. 22, the mixed signal generator 170 is constituted to amplify both of the amplitude signal and the phase signal with the preset gains $G_{A1}$, $G_{A2}$, and $G_{A3}$ and the preset gains $G_{\varphi1}$, $G_{\varphi2}$, and $G_{\varphi3}$, respectively, and to perform the addition processing of the amplitude signal amplified with one of the gains $G_{A1}$, $G_{A2}$, and $G_{A3}$ and the phase signal amplified with one of the gains $G_{\varphi1}$, $G_{\varphi2}$, and $G_{\varphi3}$.

[Signal Processing of Mixed Signal Generator 170]

Details of the signal processing of the mixed signal generator 170 are similar to those of the signal processing of the mixed signal generator 130. Hereinafter, description will simply be made.

Assume that the vibrating signal is $A_0 \sin \omega_0 t$. Where, $A_0$ is an amplitude of the vibrating signal, $\omega_0$ is an angular vibration frequency of the vibrating signal, and t is time. A synchronous signal is, for example, a square wave signal of the same frequency (i.e., the angular vibration frequency $\omega_0$) and the same phase as in the vibrating signal.

Assume that the displacement signal of a cantilever 112 is $A \sin(\omega_0 t + \varphi_0 + \varphi)$. Where, A is an amplitude of the displacement signal, $\varphi_0$ is an initial phase difference of the displacement signal, which is present in a state where a probe 111 is not in contact with a sample 119, and $\varphi_0$ is a phase difference of the displacement signal that is caused by the contact of the probe 111 with the sample 119.

A phase regulating portion 133 provides a phase offset $(+\psi)$ to a phase of a synchronous signal output from the signal generator 134. The phase difference information detecting section 132 generates and outputs a phase signal $A \cos(\varphi_0 + \varphi - \psi)$ including information of the phase difference between the displacement signal $A \sin(\omega_0 t + \varphi_0 + \varphi)$ of the cantilever 112 and the synchronous signal to which the phase offset ($+\psi$) is provided.

Preferably, the phase regulating portion 133 shifts the phase of the synchronous signal as much as ($\varphi_0 - \pi/2$). That is, $\psi = \varphi_0 - \pi/2$. In this case, the phase signal output from the phase difference information detecting section 132 is $A \cos\{\varphi_0 + \varphi - (\varphi_0 - \pi/2)\} = -A \sin \varphi$.

The amplitude information detecting section 131 detects the amplitude A of the displacement signal $A \sin(\omega_0 t + \varphi_0 + \varphi)$ of the cantilever 112, and outputs the amplitude signal A indicating the amplitude.

The amplitude signal amplifying sections 171A, 172A, and 173A amplify the amplitude signal output from the amplitude information detecting section 131 with the gains $G_{A1}$, $G_{A2}$, and $G_{A3}$, and output $G_{A1}A$, $G_{A2}A$, and $G_{A3}A$ as amplitude signals, respectively.

The phase signal amplifying sections 171B, 172B, and 173B amplify the phase signal output from the phase difference information detecting section 132 with the gains $G_{\varphi 1}$, $G_{\varphi 2}$, and $G_{\varphi 3}$, and output $-G_{\varphi 1}A \sin \varphi$, $-G_{\varphi 2}A \sin \varphi$, and $-G_{\varphi 3}A \sin \varphi$ as phase signals, respectively.

The gains $G_{A1}$, $G_{A2}$, and $G_{A3}$ of the amplitude signal amplifying sections 171A, 172A, and 173A and the phase signal gains $G_{\varphi 1}$, $G_{\varphi 2}$, and $G_{\varphi 3}$ of the phase signal amplifying sections 171B, 172B, and 173B determine three mixture ratios of the amplitude signal A and the phase signal ($-A \sin \varphi$), respectively. Furthermore, when the mixture ratios are $G_{A1}/G_{\varphi 1}$, $G_{A2}/G_{\varphi 2}$, and $G_{A3}/G_{\varphi 3}$, one of the mixture ratios is smaller than 1, and the other ratio is larger than 1.

The mixed signal generator 170 outputs, as the mixed signal, one of $A(G_{A1} - G_{\varphi 1} \sin \varphi)$, $A(G_{A2} - G_{\varphi 2} \sin \varphi)$, and $A(G_{A3} - G_{\varphi 3} \sin \varphi)$ by the selecting section 174 and the calculating section 135, or by the calculating sections 175, 176, and 177 and the selecting section 178. In other words, the mixed signal generator 170 is constituted to mix the amplitude signal and the phase signal at one of the three preset mixture ratios.

The mixture ratio of the amplitude signal A and the phase signal ($-A \sin \varphi$) is selected in accordance with a hardness (softness) of a measurement portion. In other words, the mixed signal output from the mixed signal generator 170 is switched. When a hard portion is dominant as the measurement portion of the sample in which the hard portion and a soft portion are mixed, there is sent, to the mixed signal generator 170, a selection signal to mix the amplitude signal and the phase signal at the mixture ratio in which the ratio of the amplitude signal A is large. Furthermore, when the soft portion is dominant as the measurement portion of the sample in which the hard portion and the soft portion are mixed, there is sent, to the mixed signal generator 170, a selection signal to mix the amplitude signal and the phase signal at the mixture ratio in which the ratio of the phase signal ($-A \sin \varphi$) is large.

The mixed signal output from the mixed signal generator 170 is supplied to a Z control section 126 in the controller 125 via a mixed signal gain regulating section 128 as shown in FIG. 20. The Z control section 126 supplies, to a Z driver 123, a Z control signal to control a distance between the sample 119 and the probe 111 so that the mixed signal is kept to be constant. The Z driver 123 controls a Z scanner 121 in accordance with the Z control signal to be supplied. As a result, the distance between the sample 119 and the probe 111 is controlled to keep the mixed signal to be constant.

The controller 125 supplies, to an XY driver 124, an XY scanning signal to two-dimensionally scan the probe 111 along the surface of the sample 119. The XY driver 124 controls an XY scanner 122 in accordance with the XY scanning signal to be supplied. As a result, the probe 111 is two-dimensionally scanned along the surface of the sample 119.

The controller 125 also supplies the XY scanning signal and the Z control signal to a host computer 127. The host computer 127 forms an image of the surface of the sample 119 by use of the XY scanning signal and the Z control signal, and displays the image, or stores data of the image.

In the scanning probe microscope of the present embodiment, a repulsive force working between the sample 119 and the probe 111 is detected as the mixed signal $A(G_A - G_\varphi \sin \varphi)$, and on the basis of the signal, the distance between the sample 119 and the probe 111 is controlled. When the measurement portion is hard, the amplitude signal A noticeably changes. That is, when the measurement portion is hard, the amplitude signal $G_A A$ noticeably changes. Furthermore, when the measurement portion is soft, the phase signal ($-A \sin \varphi$) noticeably changes. That is, when the measurement portion is soft, the phase signal ($-G_\varphi A \sin \varphi$) noticeably changes. Therefore, even when the hard portion and the soft portion are mixed in the sample 119, the repulsive force working between the sample 119 and the probe 111 to both of the portions can sensitively be detected. Furthermore, the mixture ratio of the amplitude signal A and the phase signal ($-A \sin \varphi$) can be changed among the preset mixture ratios. The mixture ratio of the amplitude signal A and the phase signal ($-A \sin \varphi$) is changed in accordance with the hardness (the softness) of the measurement portion, whereby in the sample in which the hard portion and the soft portion are mixed, an optimum detection state can be obtained even in any manner where the portions are mixed. As a result, even a surface shape of the sample in which the hard portion and the soft portion are mixed can accurately and stably be determined.

In the above description, the mixed signal generator 170 is constituted to amplify both of the amplitude signal and the phase signal with the preset gains $G_{A1}$, $G_{A2}$, and $G_{A3}$ and the preset gains $G_{\varphi 1}$, $G_{\varphi 2}$, and $G_{\varphi 3}$, and to perform the addition processing of the amplitude signal amplified with one of the gains $G_{A1}$, $G_{A2}$, and $G_{A3}$ and the phase signal amplified with one of the gains $G_{\varphi 1}$, $G_{\varphi 2}$, and $G_{\varphi 3}$, respectively, but the constitution may be modified similarly to the modification of the third embodiment shown in FIG. 10. That is, there is enabled a modification in which a gain of one of the amplitude signal amplifying section 171A, 172A or 173A and the phase signal amplifying section 171B, 172B or 173B is fixed to 1, or a modification in which one of the amplitude signal amplifying section 171A, 172A or 173A and the phase signal amplifying section 171B, 172B or 173B is omitted. In other words, the mixed signal generator 170 may be constituted to amplify one of the amplitude signal and the phase signal with the preset gains, respectively, and to perform the addition processing one of the amplitude signal and the phase signal which is amplified with one of these gains and the other one of the amplitude signal and the phase signal. In such a modification, if necessary, a gain of a feedback loop may be regulated (corrected) by the mixed signal gain regulating section 128.

Furthermore, the scanning probe microscope of the present embodiment may be modified to comprise an amplitude display section (display) to display the amplitude signal output from the mixed signal generator 170, and a phase display section (display) to display the phase signal output from the mixed signal generator 170, in the same manner as in the fifth embodiment.

<Problems of Following Seventh to Ninth Embodiments>

In an AC mode AFM, a change amount of an amplitude of a displacement of a cantilever is largest in the vicinity of a resonance frequency of the cantilever. Therefore, in an amplitude modulation system (the AM system) in which control is executed on the basis of the change of the amplitude of the displacement of the cantilever, a vibration frequency of the cantilever is set to the vicinity of the resonance frequency of the cantilever. Furthermore, also in a phase modulation system (the PM system) in which control is executed on the basis of the change of a phase of the displacement of the cantilever, a detection sensitivity is highest in the vicinity of the resonance frequency of the cantilever.

The change of the phase of the displacement of the cantilever, i.e., a phase difference caused by contact of a sample with a probe is detected by a phase detection circuit of a lock-in amplifier or the like. This phase detection circuit outputs A cos φ as a phase signal. Where, A is an amplitude of a displacement signal of the cantilever, and φ is the phase difference between the displacement signal of the cantilever and a synchronous signal (called a reference signal sometimes) synchronized with a vibrating signal.

The phase difference φ between the displacement signal of the cantilever and the synchronous signal synchronized with the vibrating signal has a certain value, even when the sample is not in contact with the probe. First, the cantilever is vibrated at a mechanical resonance frequency of the cantilever, and hence a phase difference of π/2 is surely generated between the displacement signal and the synchronous signal. Additionally, an individual difference of the cantilever is present in the mechanical resonance frequency of the cantilever, and hence the frequency at which the cantilever is to be vibrated changes, which disadvantageously generates an unpredictable phase difference caused by mechanical vibration properties of a piezoelectric element to vibrate the cantilever or a holder holding the cantilever. That is, an initial value of the unpredictable phase difference is present in the phase difference between the displacement signal of the cantilever and the synchronous signal synchronized with the vibrating signal even in a state where the sample is not in contact with the probe. In the phase signal A cos φ, a change amount of the signal to a change of φ, i.e., a detection sensitivity changes in accordance with the initial value of φ. As a result, in the conventional AC mode AFM, the detection sensitivity disadvantageously changes every time the cantilever is replaced.

The following seventh to ninth embodiments have been developed in view of such problems, and an object thereof is to provide a scanning probe microscope capable of easily correcting a change of a detection sensitivity of phase detection that takes place every time a cantilever is replaced.

<Seventh Embodiment>

A constitution of a scanning probe microscope of the present embodiment is shown in FIG. 23. As shown in FIG. 23, the scanning probe microscope includes a cantilever 212 having a probe 211 at a free end thereof. The cantilever 212 may be held by a holder 213 to correctly face a sample 219.

The scanning probe microscope also includes a displacement detector 215 to detect a displacement of the cantilever 212 and output a displacement signal indicating the displacement. The displacement detector 215 is constituted of an optical lever type optical displacement sensor, and comprises a laser light source 216 to apply focused laser light onto a back surface of the cantilever 212, a divided detector 217 to receive the laser light reflected from the back surface of the cantilever 212, and an operational amplifier 218 to generate the displacement signal of the cantilever 212 from an output of the divided detector 217.

The scanning probe microscope also includes a vibrator 214 to vibrate the cantilever 212 on the basis of a vibrating signal. The vibrator 214 is disposed in, for example, the holder 213. The vibrator 214, which may be constituted of, for example, a piezoelectric element, may vibrate the cantilever 212 with a predetermined amplitude at a frequency in the vicinity of a mechanical resonance frequency of the cantilever.

The scanning probe microscope also includes a scanner 220 to three-dimensionally relatively move the sample 219 and the probe 211. The scanner 220 is constituted of a Z scanner 221 and an XY scanner 222. The Z scanner 221 is disposed on the XY scanner 222, and on the Z scanner 221, the sample 219 may be mounted via an unshown sample base. The Z scanner 221 is driven by a Z driver 223, so that the sample 219 may be moved to the probe 211 in a Z direction. Furthermore, the XY scanner 222 is driven by an XY driver 224, so that the sample 219 may be moved to the probe 211 in XY directions.

The scanning probe microscope also includes a controller 225 to control the Z driver 223 and the XY driver 224, and a host computer 228 to form an image of the surface of the sample 219. The controller 225 may generate an XY scanning signal to two-dimensionally scan the probe 211 along the surface of the sample 219, and a Z control signal to control a distance between the probe 211 and the sample 219. The controller 225 includes a selecting section 226 to select one of an amplitude signal and a phase signal described later to supply the signal to a Z control section 227, and the Z control section 227 to generate the Z control signal on the basis of a signal to be supplied from the selecting section 226. The host computer 228 may form the image of the surface of the sample 219 by use of the XY scanning signal and the Z control signal generated by the controller 225. The host computer 228 includes an input section 229 to input and sets information of a phase offset described later.

The scanning probe microscope also includes a signal processing unit 230 to supply the vibrating signal to the vibrator 214, and also generates the amplitude signal and the phase signal from a displacement signal output from the displacement detector 215. The signal processing unit 230 includes a signal generator 231, an amplitude information detecting section 232, an amplitude display section (display) 233, a phase difference information detecting section 234 and a phase display section (display) 236.

The signal generator 231 outputs, for example, the vibrating signal to vibrate the cantilever 212 with the predetermined amplitude at the frequency in the vicinity of the mechanical resonance frequency of the cantilever. The signal generating section 231 also outputs a synchronous signal synchronized with the vibrating signal to the phase difference information detecting section 234. This synchronous signal may be constituted of, for example, a square wave signal (a logic signal) of the same frequency and the same phase as in the vibrating signal.

The amplitude information detecting section 232 generates the amplitude signal indicating an amplitude of the displacement signal of the cantilever 212 supplied from the displacement detector 215, to output this signal to the amplitude display section 233 and the controller 225.

The amplitude display section 233 may display the amplitude signal to be supplied from the amplitude information detecting section 232. The amplitude display section 233 may be constituted of, for example, a display unit to display a voltage value of a signal of a digital meter, an analog meter, an oscilloscope or the like. The amplitude display section 233, for example, displays a value of the amplitude signal, i.e., the amplitude value. In place of the amplitude display section 233, a monitor of the host computer 228 may be used.

The phase difference information detecting section 234 generates the phase signal including information of a phase difference between the displacement signal of the cantilever 212 supplied from the displacement detector 215 and the synchronous signal supplied from the signal generator 231, to output this signal to the phase display section 236 and the controller 225. The synchronous signal and the vibrating signal have the same frequency and the same phase, and hence the phase difference between the displacement signal and the synchronous signal is equivalent to a phase difference between the displacement signal and the vibrating signal.

The phase difference information detecting section 234 comprises a phase regulating portion 235 capable of regulating a phase of the synchronous signal supplied from the signal generator 231. The phase regulating portion 235 may provide, to the phase of the synchronous signal, a predetermined phase offset indicated by a phase offset command supplied from the controller 225. In other words, the phase regulating portion 235 may provide the predetermined phase offset to the phase difference between the displacement signal and the synchronous signal. The phase difference information detecting section 234 generates and outputs the phase signal including the information of the phase difference between the synchronous signal to which the phase offset is provided and the displacement signal. The phase difference between the synchronous signal to which the phase offset is provided and the displacement signal is equivalent to the phase difference between the displacement signal and the synchronous signal, to which the phase offset is provided. The predetermined phase offset is input and set by the input section 229 of the host computer 228 to cancel an initial phase difference present in a state where the probe 211 is not in contact with the sample 219. That is, the phase regulating portion 235 provides the phase offset to cancel the initial phase difference to the phase difference between the displacement signal and the synchronous signal.

The phase display section 236 may display the phase signal to be supplied from the phase difference information detecting section 234. The phase display section 236 may be constituted of, for example, a display unit to display a voltage value of a signal of a digital meter, an analog meter, an oscilloscope or the like. The phase display section 236 displays, for example, a value of the phase signal. In place of the phase display section 236, a monitor of the host computer 228 may be used.

Here, a flow of the signals in the signal processing unit 230 is described with reference to FIG. 24.

Assume that the vibrating signal is $A_0 \sin \omega_0 t$. Where, $A_0$ is an amplitude of the vibrating signal, $\omega_0$ is an angular vibration frequency of the vibrating signal, and t is time. When the resonance frequency of the cantilever 212 is $f_0$, $\omega_0$ has a value substantially equal to $2\pi \cdot f_0$.

Assume that the synchronous signal is, for example, a square wave signal of the same frequency (i.e., the angular vibration frequency $\omega_0$) and the same phase as in the vibrating signal.

Assume that the displacement signal of the cantilever 212 is $A \sin(\omega_0 t + \varphi_0 + \varphi)$. Where, A is the amplitude of the displacement signal, $\varphi_0$ is the initial phase difference of the displacement signal, which is present in a state where the probe 211 is not in contact with the sample 219, and $\varphi$ is a phase difference of the displacement signal that is caused by the contact of the probe 211 with the sample 219. When the probe 211 is not in contact with the sample 219, $\varphi$ is 0.

The amplitude information detecting section 232 detects the amplitude A of the displacement signal $A \sin(\omega_0 t + \varphi_0 + \varphi)$ of the cantilever 212, and outputs an amplitude signal A indicating the amplitude.

The phase regulating portion 235 provides a phase offset $\psi_0$ to the phase of the synchronous signal on the basis of the phase offset command. That is, the phase regulating portion 235 shifts the phase of the synchronous signal as much as $\psi_0$. This is equivalent to providing a phase offset ($-\psi_0$) to the phase difference between the displacement signal of the cantilever 212 and the synchronous signal (i.e., the vibrating signal). The phase difference information detecting section 234 generates and outputs a phase signal $A \cos(\varphi_0 + \varphi - \psi_0)$ including the information of the phase difference between the displacement signal $A \sin(\omega_0 t + \varphi_0 + \varphi)$ of the cantilever 212 and the synchronous signal to which the phase offset $\psi_0$ is provided.

Next, a procedure of phase regulation will be described.

In the state where the probe 211 is not in contact with the sample 219, the vibrating signal $A_0 \sin \omega_0 t$ is first output from the signal generator 231. Simultaneously with this output, the signal generator 231 outputs the square wave signal of the same frequency (the angular vibration frequency $\omega_0$) and the same phase as in the vibrating signal.

Next, in the input section 229 of the host computer 228, the phase offset $\psi_0$ to be provided to the synchronous signal is input and set. The phase offset $\psi_0$ to be set at this time may be any value. The phase regulating portion 235 shifts the phase of the synchronous signal as much as $\psi_0$ on the basis of the phase offset command. The phase difference information detecting section 234 generates and outputs the phase signal $A \cos(\varphi_0 + \varphi - \psi_0)$ including the information of the phase difference between the displacement signal $A \sin(\omega_0 t + \varphi_0 + \varphi)$ of the cantilever 212 and the synchronous signal to which the phase offset $\psi_0$ is provided. The phase display section 236 displays a value of the phase signal $A \cos(\varphi_0 + \varphi - \psi_0)$. Here, $\varphi$ is 0 in the existing state where the probe 211 is not in contact with the sample 219. Therefore, in the phase display section 236, a value of $A \cos(\varphi_0 - \psi_0)$ is displayed.

Next, in the input section 229 of the host computer 228, the phase offset $\psi_0$ is regulated so that the value of $A \cos(\varphi_0 - \psi_0)$ is a maximum value, i.e., A, while monitoring the value of $A \cos(\varphi_0 - \psi_0)$ displayed in the phase display section 236. As a result, the phase offset $\psi_0$ is set to be equal to $\varphi_0$. That is, the initial phase difference $\varphi_0$ is canceled.

After this regulation, the phase signal including the information of the phase difference $\varphi$ output from the phase difference information detecting section 234 is $A \cos \varphi$. From the above description, according to the scanning probe microscope and the phase regulating method of the present embodiment, it is possible to easily cancel the initial phase difference $\varphi_0$ present in the state where the probe 211 is not in contact with the sample 219. In other words, it is possible to easily correct a change of a detection sensitivity of phase detection that takes place every time the cantilever 212 is replaced. As a result, it is possible to detect, with suitable reproducibility, the phase signal including the information of the phase difference $\varphi$ caused by the contact of the probe 211 with the sample 219.

[Modification]

Figure 25:
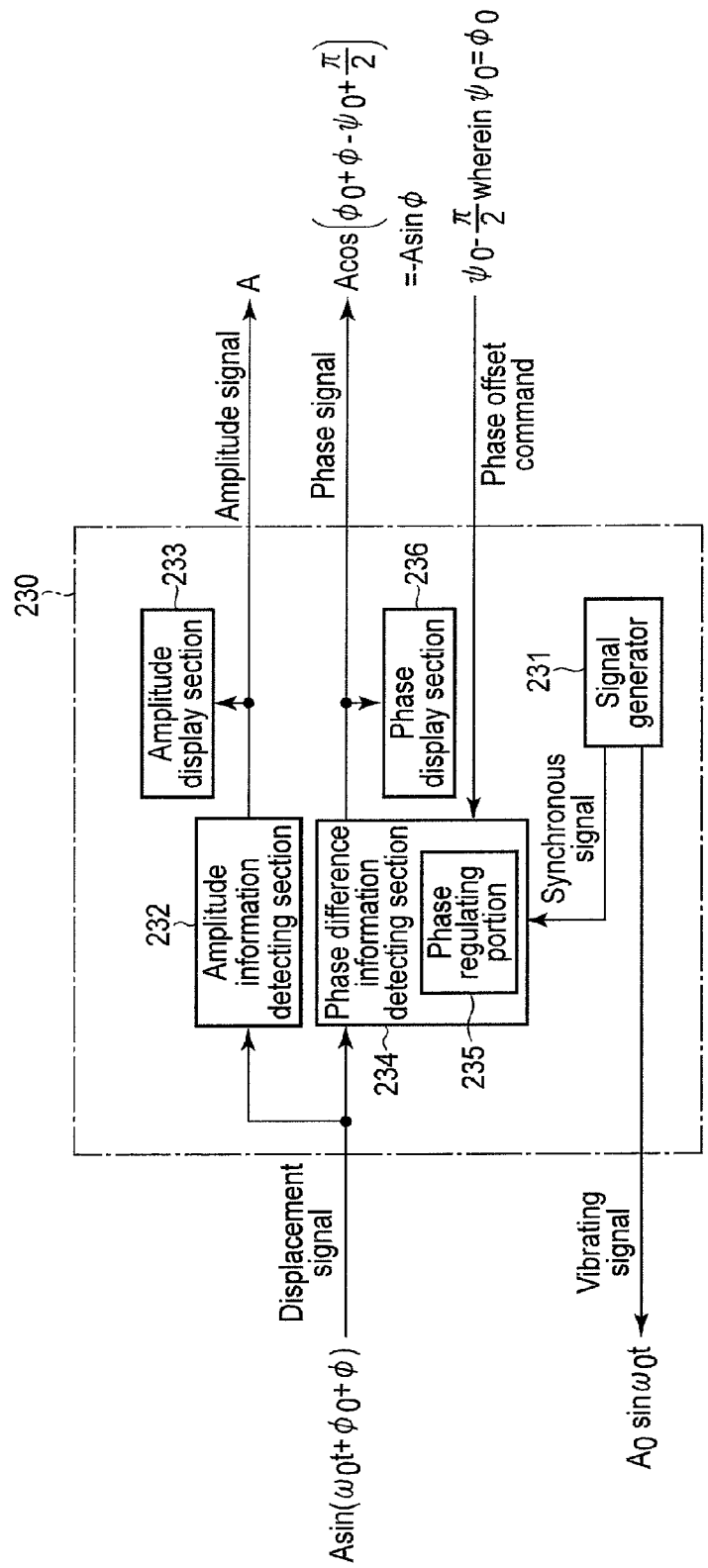
FIG. 25 shows a flow of signals in the signal processing section of FIG. 23 by a modification of the seventh embodiment.

The above-mentioned procedure of the phase regulation may be modified as described in the following. The procedure of the phase regulation of this modification will be described with reference to FIG. 25. In FIG. 25, members denoted with the same reference numerals as in the members shown in FIG. 23 are similar members, and detailed description thereof is omitted.

In a state where a probe 211 is not in contact with a sample 219, a vibrating signal $A_0 \sin \omega_0 t$ is first output from a signal generator 231. Simultaneously with this output, a square wave signal having the same frequency (an angular vibration frequency $\omega_0$) and the same phase as in the vibrating signal is output from the signal generator 231.

First, the following is performed as <a first step>.

In an input section 229 of a host computer 228, a phase offset $\psi_0$ to be provided to a synchronous signal is input and set. The phase offset $\psi_0$ to be set at this time may be any value. A phase regulating portion 235 shifts a phase of the synchronous signal as much as $\psi_0$ on the basis of a phase offset command. A phase difference information detecting section 234 generates and outputs a phase signal $A \cos(\varphi_0 + \varphi - \psi_0)$ including information of a phase difference between a displacement signal $A \sin(\omega_0 t + \varphi_0 + \varphi)$ of a cantilever 212 and the synchronous signal to which the phase offset $\psi_0$ is provided. A phase display section 236 displays a value of the phase signal $A \cos(\varphi_0 + \varphi - \psi_0)$. Here, $\varphi$ is 0 in the existing state where the probe 211 is not in contact with the sample 219. Therefore, in the phase display section 236, a value of $A \cos(\varphi_0 - \psi_0)$ is displayed.

Next, in the input section 229 of the host computer 228, the phase offset $\psi_0$ is regulated so that the value of $A \cos(\varphi_0 - \psi_0)$ is a maximum value, i.e., A, while monitoring the value of $A \cos(\varphi_0 - \psi_0)$ displayed in the phase display section 236. As a result, the phase offset $\psi_0$ is set to be equal to $\varphi_0$. After this regulation, the phase signal including the information of a phase difference $\varphi$ output from the phase difference information detecting section 234 is $A \cos \varphi$.

Next, the following is performed as <a second step>.

In the input section 229 of the host computer 228, in place of the phase offset $\psi_0$ described hitherto, a phase offset equal to a value obtained by adding $(-\pi/2)$ to $\psi_0$ $(=\varphi_0)$ is newly input and set. That is, in the input section 229 of the host computer 228, the phase offset to be provided to the synchronous signal is changed from $\psi_0$ to $(\theta_0 - \pi/2)$. The phase regulating portion 235 shifts the phase of the synchronous signal as much as $(\psi_0 - \pi/2) = (\varphi_0 - \pi/2)$ on the basis of the phase offset command. The phase difference information detecting section 234 generates and outputs a phase signal $A \cos(\varphi_0 + \varphi - \varphi_0 + \pi/2) = A \cos(\varphi + \pi/2) = -A \sin \varphi$ including information of the phase difference between the displacement signal $A \sin(\omega_0 t + \varphi_0 + \varphi)$ of the cantilever 212 and the synchronous signal to which the phase offset of $(\varphi_0 - \pi/2)$ is provided. In this case, the phase regulating portion 235 shifts the phase of the synchronous signal as much as ($_0 - \pi/2$), whereby a second phase offset $(-\varphi_0 + \pi/2)$ is provided to the phase difference $(\varphi_0 + \varphi)$ between the displacement signal of the cantilever 212 and the synchronous signal (i.e., the vibrating signal).

Figure 26:
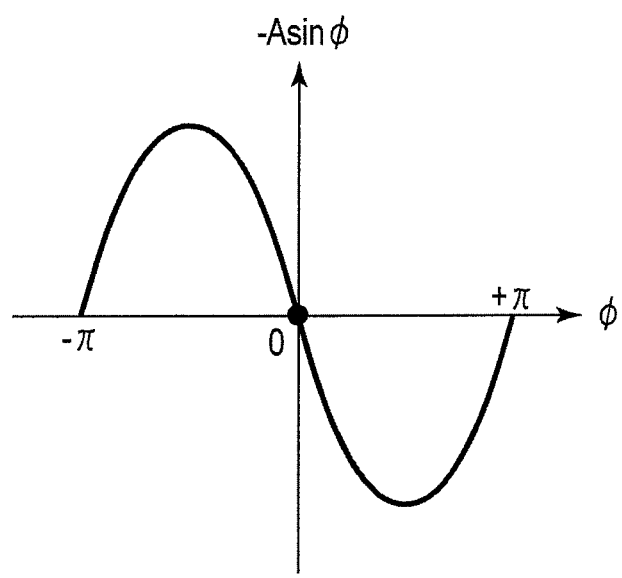
FIG. 26 is a graph showing a relation between −A sin φ and φ.

FIG. 26 is a graph showing a relation between $-A \sin \varphi$ and $\varphi$. As seen from this graph, $-A \sin \varphi$ most sensitively changes in response to a change of a phase shift amount $\varphi$ in $\varphi=0$. In consequence, it may be considered that the phase difference $\varphi$ caused by the contact of the probe 211 with the sample 219 can most efficiently be detected.

From the above description, according to the modification of the scanning probe microscope and the phase regulating method of the present embodiment, it is possible to cancel the initial phase difference $\varphi_0$ present in the state where the probe 211 is not in contact with the sample 219. In other words, it is possible to easily correct a change of a detection sensitivity of phase detection that takes place every time the cantilever 212 is replaced. Additionally, it is further possible to efficiently detect the phase difference $\varphi$ caused by the contact of the probe 211 with the sample 219. As a result, it is possible to detect the phase difference $\varphi$ caused by the contact of the probe 211 with the sample 219, with high sensitivity and suitable reproducibility.

<Eighth Embodiment>

A scanning probe microscope of the present embodiment is the same as the scanning probe microscope of the seventh embodiment except that a constitution of a signal processing unit is different. Consequently, here, description is made while importance is placed on the constitution and a function of the signal processing unit of the present embodiment.

FIG. 27 shows the constitution of the scanning probe microscope of the present embodiment. In FIG. 27, members denoted with the same reference numerals as in the members shown in FIG. 23 are similar members, and detailed description thereof is omitted.

As shown in FIG. 27, a signal processing unit 240 in the scanning probe microscope of the present embodiment comprises a dividing section 241 and a phase display section 242, in place of the phase display section 236 of the signal processing unit 230 in the scanning probe microscope of the seventh embodiment.

The dividing section 241 divides a phase signal supplied from a phase difference information detecting section 234 by an amplitude signal supplied from an amplitude information detecting section 232, and generates and outputs a division signal indicating the result.

The phase display section 242 may display the division signal supplied from the dividing section 241. The phase display section 242 may be constituted of, for example, a display unit to display a voltage value of a signal of a digital meter, an analog meter, an oscilloscope or the like. The phase display section 242 displays, for example, a value of the phase signal. In place of the phase display section 242, a monitor of a host computer 228 may be used.

Here, a flow of the signals in the signal processing unit 240 is described.

Similarly to the seventh embodiment, assume that the vibrating signal is $A_0 \sin \omega_0 t$. Where, $A_0$ is an amplitude of the vibrating signal, $\omega_0$ is an angular vibration frequency of the vibrating signal, and t is time. When a resonance frequency of a cantilever 212 is $f_0$, $\omega_0$ has a value substantially equal to $2\pi \cdot f_0$.

A synchronous signal is, for example, a square wave signal of the same frequency (i.e., the angular vibration frequency $\omega_0$) and the same phase as in the vibrating signal.

Assume that the displacement signal of the cantilever 212 is $A \sin(\omega_0 t + \varphi_0 + \varphi)$. Where, A is an amplitude of the displacement signal, $\varphi_0$ is an initial phase difference of the displacement signal, which is present in a state where a probe 211 is not in contact with a sample 219, and $\varphi$ is a phase difference of the displacement signal that is caused by the contact of the probe 211 with the sample 219. When the probe 211 is not in contact with the sample 219, $\varphi$ is 0.

The amplitude information detecting section 232 detects the amplitude A of the displacement signal $A \sin(\omega_0 t + \varphi_0 + \varphi)$ of the cantilever 212, and outputs an amplitude signal A indicating the amplitude.

A phase regulating portion 235 shifts a phase of the synchronous signal as much as $\psi_0$ on the basis of a phase offset command. The phase difference information detecting section 234 generates and outputs a phase signal $A \cos(\varphi_0 + \varphi - \psi_0)$ including information of the phase difference between the displacement signal $A \sin(\omega_0 t + \varphi_0 + \varphi)$ of the cantilever 212 and the synchronous signal to which a phase offset $\psi_0$ is provided.

The dividing section 241 generates and outputs a division signal $\cos(\varphi_0 + \varphi - \psi_0)$ indicating the result obtained by dividing the phase signal $A \cos(\varphi_0 + \varphi - \psi_0)$ by the amplitude signal $A$. The phase display section 242 displays the value of the division signal $\cos(\varphi_0 + \varphi - \psi_0)$.

Next, a procedure of phase regulation will be described.

In the state where the probe 211 is not in contact with the sample 219, a vibrating signal $A \sin \omega_0 t$ is first output from a signal generator 231. Simultaneously with this output, the signal generator 231 outputs the square wave signal of the same frequency (the angular vibration frequency $\omega_0$) and the same phase as in the vibrating signal.

Next, in an input section 229 of the host computer 228, the phase offset $\psi_0$ to be provided to the synchronous signal is input and set. The phase offset $\psi_0$ to be set at this time may be any value. The phase regulating portion 235 shifts the phase of the synchronous signal as much as $\psi_0$ on the basis of the phase offset command. The phase difference information detecting section 234 generates and outputs the phase signal $A \cos(\varphi_0 + \varphi - \psi_0)$ including the information of the phase difference between the displacement signal $A \sin(\omega_0 t + \varphi_0 + \varphi)$ of the cantilever 212 and the synchronous signal to which the phase offset $\psi_0$ is provided. The dividing section 241 generates and outputs the division signal $\cos(\varphi_0 + \varphi - \psi_0)$ obtained by dividing the phase signal $A \cos(\varphi_0 + \varphi - \psi_0)$ by the amplitude signal $A$. The phase display section 242 displays a value of the division signal $\cos(\varphi_0 + \varphi - \psi_0)$. Here, $\varphi$ is 0 in the existing state where the probe 211 is not in contact with the sample 219. Therefore, in the phase display section 242, a value of $\cos(\varphi_0 - \psi_0)$ is displayed.

Next, in the input section 229 of the host computer 228, the phase offset $\psi_0$ is regulated so that the value of $\cos(\varphi_0 - \psi_0)$ is a maximum value, i.e., 1, while monitoring the value of $\cos(\varphi_0 - \psi_0)$ displayed in the phase display section 242. As a result, the phase offset $\psi_0$ is set to be equal to $\varphi_0$. That is, the initial phase difference $\varphi_0$ is canceled.

After this regulation, the phase signal including the information of the phase difference $\varphi$ output from the phase difference information detecting section 234 is $A \cos \varphi$. Furthermore, the division signal to be displayed in the phase display section 242 is $\cos \varphi$.

From the above description, according to the scanning probe microscope and the phase regulating method of the present embodiment, the regulation is performed so that the value of $\cos(\varphi_0 + \varphi - \psi_0)$ is 1, and hence the regulation can intuitively be performed and accuracy also enhances. That is, it is possible to accurately and easily cancel the initial phase difference $\varphi_0$ present in the state where the probe 211 is not in contact with the sample 219.

<Ninth Embodiment>

A scanning probe microscope of the present embodiment is the same as the scanning probe microscope of the seventh embodiment except that a constitution of a signal processing unit is different. Consequently, here, description is made while importance is placed on the constitution and a function of the signal processing unit of the present embodiment.

Figure 28:
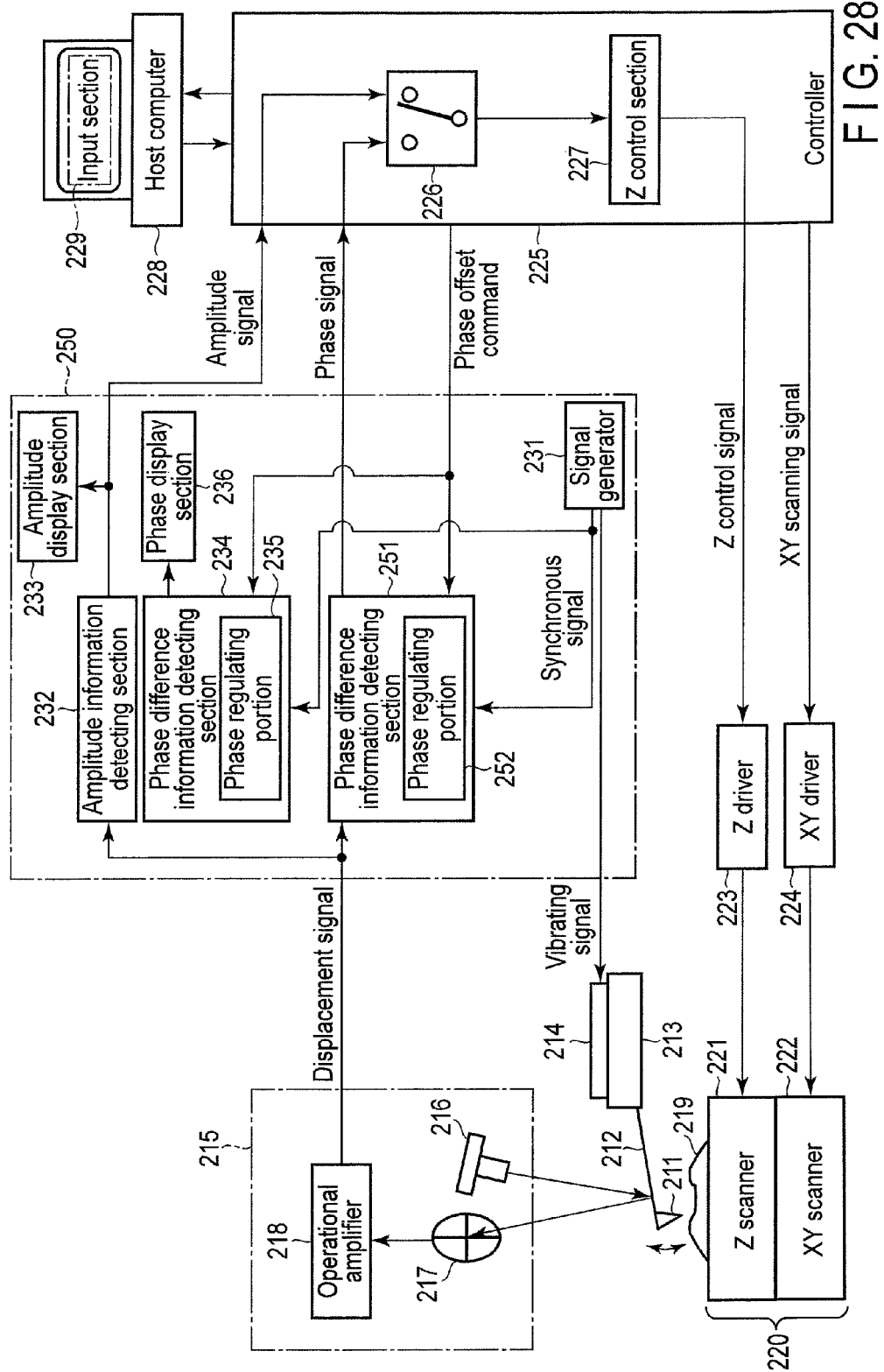
FIG. 28 shows a constitution of a scanning probe microscope of a ninth embodiment.

FIG. 28 shows the constitution of the scanning probe microscope of the present embodiment. In FIG. 28, members denoted with the same reference numerals as in the members shown in FIG. 23 are similar members, and detailed description thereof is omitted.

As shown in FIG. 28, a signal processing unit 250 in the scanning probe microscope of the present embodiment comprises a phase difference information detecting section 251, in addition to the respective constitutions of the signal processing unit 230 in the seventh embodiment, i.e., a signal generator 231, an amplitude information detecting section 232, an amplitude display section 233, a phase difference information detecting section 234 and a phase display section 236. Further, in the seventh embodiment, a phase signal output from the phase difference information detecting section 234 is supplied to the phase display section 236 and a controller 225, but in the present embodiment, a phase signal output from the phase difference information detecting section 234 is supplied to the phase display section 236, but is not supplied to the controller 225, and instead, the phase signal output from the phase difference information detecting section 251 is supplied to the controller 225.

The phase difference information detecting section 251 comprises a phase regulating portion 252 capable of regulating a phase of a synchronous signal to be supplied from the signal generator 231. The phase regulating portion 252 may provide, to the phase of the synchronous signal, a predetermined phase offset indicated by a phase offset command supplied from the controller 225. In other words, the phase regulating portion 252 may provide the phase offset to a phase difference between a displacement signal and the synchronous signal. The phase difference information detecting section 251 generates and outputs the phase signal including information of the phase difference between the synchronous signal to which the phase offset is provided by the phase regulating portion 252 and the displacement signal.

The phase regulating portion 252 shifts the phase of the synchronous signal supplied from the signal generator 231 as much as a predetermined amount. The phase regulating portion 252 provides, to the synchronous signal, a phase offset equal to a value obtained by adding $(-\pi/2)$ to a phase offset $\psi_0$ indicated by the phase offset command, and in this respect, the portion is different from the phase regulating portion 235. That is, the predetermined amount is "the phase offset indicated by the phase offset command"+"$-\pi/2$".

The phase difference information detecting section 251 generates the phase signal including information of the phase difference between the displacement signal of a cantilever 212 supplied from a displacement detector 215 and the synchronous signal to which the phase offset is provided by the phase regulating portion 252, to output this signal to the controller 225.

Furthermore, the phase difference information detecting section 234 generates a phase signal including information of the phase difference between the displacement signal of the cantilever 212 supplied from the displacement detector 215 and the synchronous signal to which the phase offset is provided by the phase regulating portion 235, to output this signal to the phase display section 236.

As described above, in the scanning probe microscope of the present embodiment, the phase signal to be supplied to the controller 225 and the phase signal to be supplied to the phase display section 236 are independently generated by the phase difference information detecting section 251 and the phase difference information detecting section 234, respectively.

Figure 29:
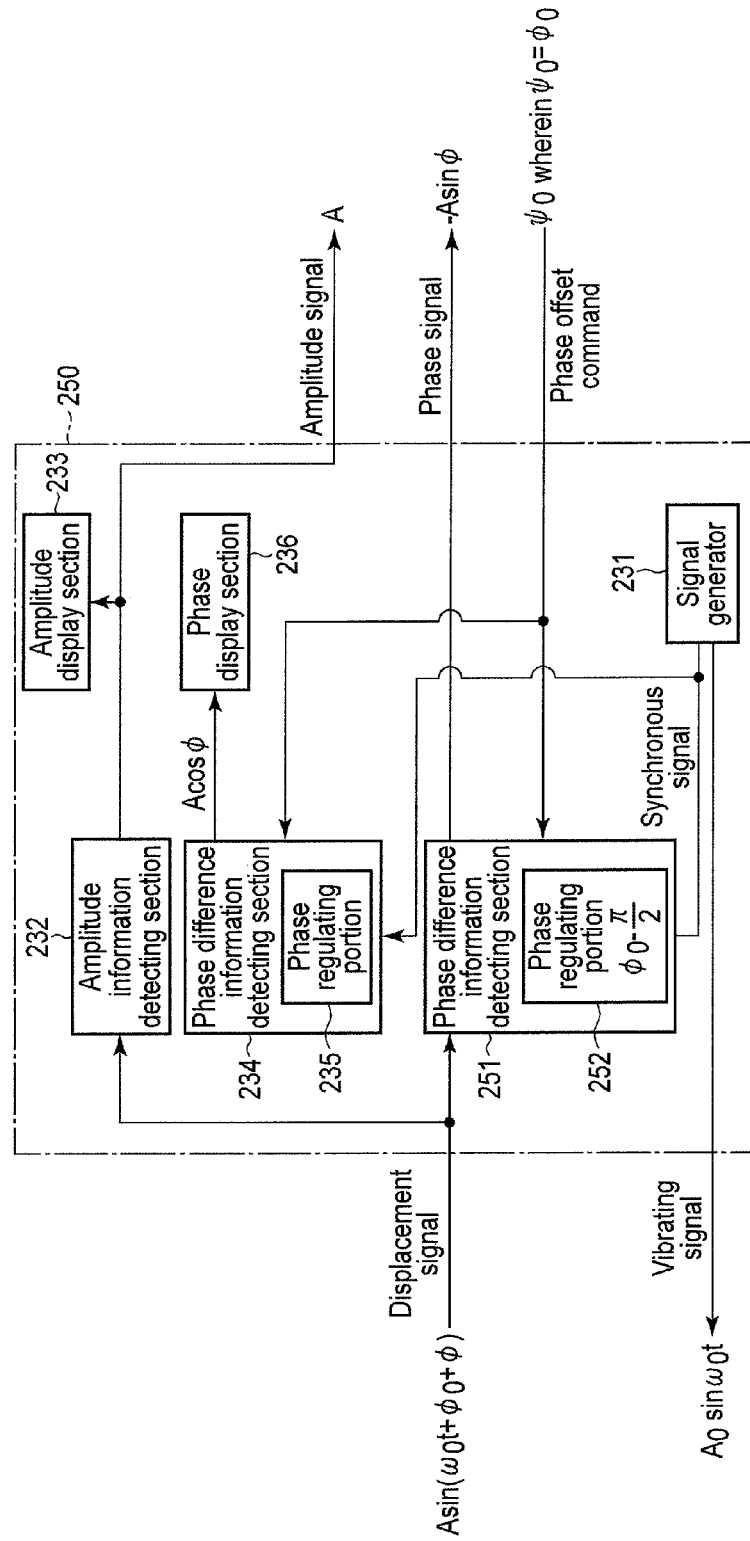
FIG. 29 shows a flow of signals in a signal processing section of FIG. 28.

Here, a flow of the signals in the signal processing unit 250 is described with reference to FIG. 29.

Similarly to the seventh embodiment, assume that the vibrating signal is $A_0 \sin \omega_0 t$. Where, $A_0$ is an amplitude of the vibrating signal, $\omega_0$ is an angular vibration frequency of the vibrating signal, and t is time. When a resonance frequency of the cantilever 212 is $f_0$, $\omega_0$ has a value substantially equal to $2\pi \cdot f_0$.

Assume that the synchronous signal is, for example, a square wave signal of the same frequency (i.e., the angular vibration frequency $\omega_0$) and the same phase as in the vibrating signal.

Assume that the displacement signal of the cantilever 212 is $A \sin(\omega_0 t + \varphi_0 + \varphi)$. Where, A is an amplitude of the displacement signal, $\varphi_0$ is an initial phase difference of the displacement signal, which is present in a state where a probe 211 is not in contact with a sample 219, and $\varphi$ is a phase difference of the displacement signal that is caused by the contact of the probe 211 with the sample 219. When the probe 211 is not in contact with the sample 219, $\varphi$ is 0.

The amplitude information detecting section 232 detects the amplitude A of the displacement signal $A \sin(\omega_0 t + \varphi_0 + \varphi)$ of the cantilever 212, and outputs an amplitude signal A indicating the amplitude.

A phase regulating portion 235 shifts the phase of the synchronous signal as much as $\psi_0$ on the basis of the phase offset command. The phase difference information detecting section 234 generates and outputs a phase signal $A \cos(\varphi_0 + \varphi - \psi_0)$ including information of the phase difference between the displacement signal $A \sin(\omega_0 t + \varphi_0 + \varphi)$ of the cantilever 212 and the synchronous signal to which the phase offset $\psi_0$ is provided. The phase display section 236 displays a value of the phase signal $A \cos(\varphi_0 + \varphi - \psi_0)$.

The phase regulating portion 252 provides, to the phase of the synchronous signal, the phase offset equal to the value obtained by adding $(-\pi/2)$ to the phase offset $\psi_0$. That is, the phase regulating portion 252 shifts the phase of the synchronous signal as much as $(\psi_0 - \pi/2)$. The phase difference information detecting section 251 generates a phase signal $A \cos(\varphi_0 + \varphi - \psi_0 + \pi/2) = -A \sin(\varphi_0 + \varphi - \psi_0)$ including information of the phase difference between the displacement signal $A \sin(\omega_0 t + \varphi_0 + \varphi)$ of the cantilever 212 and the synchronous signal to which the phase offset of $(\psi_0 - \pi/2)$ is provided, to output this signal to the controller 225.

Next, a procedure of phase regulation will be described.

In the state where the probe 211 is not in contact with the sample 219, the vibrating signal $A_0 \sin \omega_0 t$ is first output from the signal generator 231. Simultaneously with this output, the signal generator 231 outputs the square wave signal of the same frequency (the angular vibration frequency $\omega_0$) and the same phase as in the vibrating signal.

Next, in an input section 229 of a host computer 228, the phase offset $\psi_0$ to be provided to the synchronous signal is input and set. The phase offset $\psi_0$ to be set at this time may be any value. The phase regulating portion 235 shifts the phase of the synchronous signal as much as $\psi_0$ on the basis of the phase offset command. The phase difference information detecting section 234 generates and outputs the phase signal $A \cos(\varphi_0 + \varphi - \psi_0)$ including the information of the phase difference between the displacement signal $A \sin(\omega_0 t + \varphi_0 + \varphi)$ of the cantilever 212 and the synchronous signal to which the phase offset $\psi_0$ is provided. The phase display section 236 displays a value of the phase signal $A \cos(\varphi_0 + \varphi - \psi_0)$. Here, $\varphi$ is 0 in the existing state where the probe 211 is not in contact with the sample 219. Therefore, in the phase display section 236, a value of $A \cos(\varphi_0 - \psi_0)$ is displayed.

Next, in the input section 229 of the host computer 228, the phase offset $\psi_0$ is regulated so that the value of $A \cos(\varphi_0 - \psi_0)$ is a maximum value, i.e., A, while monitoring the value of $A \cos(\varphi_0 - \psi_0)$ displayed in the phase display section 236. As a result, the phase offset $\psi_0$ is set to be equal to $\varphi_0$. That is, the initial phase difference $\varphi_0$ is canceled.

The phase regulating portion 252 provides, to the phase of the synchronous signal, the phase offset equal to the value obtained by adding $(-\pi/2)$ to the phase offset $\psi_0$. That is, the phase regulating portion 252 shifts the phase of the synchronous signal as much as $(\psi_0 - \pi/2)$. The phase difference information detecting section 251 generates the phase signal $A \cos(\varphi_0 + \varphi - \psi_0 + \pi/2) = -A \sin(\varphi_0 + \varphi - \psi_0)$ including the information of the phase difference between the displacement signal $A \sin(\psi_0 t + \varphi_0 + \varphi)$ and the synchronous signal to which the phase offset of $(\psi_0 - \pi/2)$ is provided, to output this signal to the controller 225. After the above-mentioned regulation of the phase offset $\psi_0$, the phase offset $\psi_0$ is set to be equal to $\varphi_0$, and hence the phase signal including the information of the phase difference $\varphi$ output from the phase difference information detecting section 251 is $-A \sin \varphi$.

As shown in FIG. 26, $-A \sin \varphi$ most sensitively changes in response to a change of a phase shift amount $\varphi$ in $\varphi = 0$. Therefore, it is possible to most efficiently detect the phase difference $\varphi$ caused by the contact of the probe 211 with the sample 219.

From the above description, according to the scanning probe microscope and the phase regulating method of the present embodiment, it is possible to cancel the initial phase difference $\varphi_0$ present in the state where the probe 211 is not in contact with the sample 219. In other words, it is possible to easily correct a change of a detection sensitivity of phase detection that takes place every time the cantilever 212 is replaced. Additionally, it is further possible to sensitively detect the phase difference $\varphi$ caused by the contact of the probe 211 with the sample 219. As a result, it is possible to detect the phase difference $\varphi$ caused by the contact of the probe 211 with the sample 219, with high sensitivity and suitable reproducibility.

This advantage of the present embodiment is common to the modification of the seventh embodiment, but to achieve this advantage, two steps are required in the modification of the seventh embodiment, whereas in the present embodiment, one step is only required.

Furthermore, when the scanning probe microscope of the present embodiment is provided with the dividing section shown in FIG. 27 of the eighth embodiment to monitor the division signal as the result of the division of the phase signal output from the phase difference information detecting section 234 by the amplitude signal, i.e., when a combination of the present embodiment and the eighth embodiment is carried out, the regulation can intuitively be performed and accuracy also enhances. That is, it is possible to accurately and easily cancel the initial phase difference $\varphi_0$ present in the state where the probe 211 is not in contact with the sample 219.

Hitherto, the embodiments of the present invention have been described with reference to the drawings, but the present invention is not limited to these embodiments, and may be subjected to various modifications or changes without departing from the gist of the present invention. Various modifications or changes mentioned herein may include implementation performed by suitably combining the above-mentioned embodiments. Furthermore, the present invention may include apparatuses concerned with the constitutions described in the embodiments or methods concerned with the operations described in the embodiments.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A scanning probe microscope comprising:
a cantilever having a probe at a free end thereof;
a scanner which three-dimensionally relatively moves the probe and a sample;
a vibrator which vibrates the cantilever based on a vibrating signal;
a displacement detector which detects a displacement of the cantilever and outputs a displacement signal indicating the displacement; and
a phase difference information detecting circuit which generates a phase signal including information of a phase difference between the vibrating signal and the displacement signal,
wherein the phase difference information detecting circuit includes a phase regulating circuit which provides, to the phase difference, a phase offset which cancels an initial phase difference that is present when the probe is not in contact with the sample.

2. The scanning probe microscope according to claim 1, further comprising:
an input device which inputs information of the phase offset; and
a display which displays the phase signal,
wherein the phase regulating circuit provides the phase offset to the phase difference in accordance with the information input by the input device.

3. The scanning probe microscope according to claim 1, further comprising:
an amplitude information detecting circuit which generates an amplitude signal including information of an amplitude of the displacement signal;
a first display which displays the amplitude signal;
an input device which inputs information of the phase offset;
a dividing circuit which generates a division signal obtained by dividing the phase signal by the amplitude signal; and
a second display which displays the division signal.

4. The scanning probe microscope according to claim 2, further comprising:
a second phase difference information detecting circuit which generates second phase signal information including information of the phase difference,
wherein the second phase difference information detecting circuit includes a second phase regulating circuit which provides, to the phase difference, a second phase offset equal to a value obtained by adding (+π2) to the phase offset in accordance with the information input by the input device.

5. The scanning probe microscope according to claim 1, further comprising:
an amplitude information detecting circuit which generates an amplitude signal including information of an amplitude of the displacement signal; and
a mixed signal generator including the amplitude information detecting circuit and the phase difference information detecting circuit, which generates a mixed signal of the amplitude signal and the phase signal,
wherein the phase regulating circuit provides the phase offset to the phase difference and further provides (+π2) to the phase difference, by adding (+π2) to the phase offset and providing the same to the phase difference.

6. A phase regulating method of a scanning probe microscope, the method comprising:
vibrating a cantilever having a probe at a free end thereof based on a vibrating signal;
scanning the probe along a surface of a sample;
detecting a displacement of the cantilever, and outputting a displacement signal indicating the displacement;
generating a phase signal including information of a phase difference between the vibrating signal and the displacement signal; and
providing, to the phase difference, a phase offset to cancel an initial phase difference present in a state in which the probe is not in contact with the sample.

7. The method according to claim 6, wherein the providing the phase offset includes regulating the phase offset while monitoring the phase signal.

8. The method according to claim 7, wherein the regulating the phase offset comprises regulating the phase offset so that a value of the phase signal is maximum in the state in which the probe is not in contact with the sample.

9. The method according to claim 6, further comprising:
generating an amplitude signal including information of an amplitude of the displacement signal; and
generating a division signal obtained by dividing the phase signal by the amplitude signal,
wherein the providing the phase offset includes regulating the phase offset so that a value of the division signal is at 1 while monitoring the division signal, in the state in which the probe is not in contact with the sample.

10. The method according to claim 6, further comprising providing, to the phase difference, a second phase offset equal to a value obtained by adding (+π2) to the phase offset, to generate a second phase signal that changes to a maximum in response to a phase difference caused by contact of the probe with the sample.

11. The method according to claim 8, further comprising:
generating an amplitude signal including information of an amplitude of the displacement signal;
providing the phase offset to the phase difference, and then further providing (+π2) to the phase difference;
generating a mixed signal of the amplitude signal and the phase signal; and
controlling a distance between the probe and the sample based on the mixed signal.

12. The method according to claim 11, wherein the amplitude signal is a second phase signal including information of a phase difference between the vibrating signal and the displacement signal.

* * * * *